US010467579B1

(12) United States Patent
Reiss et al.

(10) Patent No.: US 10,467,579 B1
(45) Date of Patent: Nov. 5, 2019

(54) SYSTEMS, METHOD, AND COMPUTER-READABLE MEDIA FOR ESTIMATING TIMING FOR DELIVERY ORDERS

(71) Applicant: Square, Inc., San Francisco, CA (US)

(72) Inventors: Jesse Lee Reiss, San Francisco, CA (US); Benjamin R. Bernstein, San Francisco, CA (US); Matthew Rhodes, San Francisco, CA (US); James F. Butts, III, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 605 days.

(21) Appl. No.: 14/663,678

(22) Filed: Mar. 20, 2015

(51) Int. Cl.
*G06Q 30/00* (2012.01)
*G06Q 10/08* (2012.01)
*G08G 1/01* (2006.01)

(52) U.S. Cl.
CPC ....... *G06Q 10/0833* (2013.01); *G08G 1/0112* (2013.01)

(58) Field of Classification Search
CPC .......................... G06Q 10/0833; G08G 1/0112
USPC ................................................ 705/26.1, 330
See application file for complete search history.

(56) References Cited

U.S. PATENT DOCUMENTS

| | | |
|---|---|---|
| 6,026,375 A | 2/2000 | Hall et al. |
| 6,324,476 B1 | 11/2001 | Trovato |
| 8,458,044 B2 | 6/2013 | Blair et al. |
| 8,504,435 B2 | 8/2013 | Charles |
| 9,269,103 B1 | 2/2016 | Kumar et al. |
| 9,466,045 B1 | 10/2016 | Kumar |
| 9,639,908 B1 | 5/2017 | Reiss et al. |
| 9,679,489 B2 | 6/2017 | Lambert et al. |
| 9,754,331 B1 | 9/2017 | Beckelman et al. |

(Continued)

FOREIGN PATENT DOCUMENTS

WO  2011/140130 A2  11/2011

OTHER PUBLICATIONS

GPS Comes to High-Tech Pizza-Delivery Tracking; One Papa John's chain lets customers track their deliveries street by street. Domino's, meanwhile, is making its own tracking technology push, Feb. 1, 2008, CMP Media, Inc. (Year: 2008).*

(Continued)

*Primary Examiner* — Brittney N Miller
(74) *Attorney, Agent, or Firm* — Mattingly & Malur, PC

(57) ABSTRACT

In some examples, a service may determine delivery timings based on a delivery location and at least one local condition, such as traffic. The system includes one or more buyer devices and a plurality of courier devices that communicate with a service computing device over a network. The buyer device and the courier devices provide geographic location information to the service, such as based on input from respective GPS receivers. The service may determine local traffic information based on tracking the courier movement, and may determine predicted travel times from the merchant pickup location to the delivery location, and from the buyer order location to the delivery location. Based on the predicted travel times and a preparation time for an ordered item, the service may manage timing for preparation and delivery of an item so that the courier's arrival at the delivery location approximately coincides with buyer's arrival.

22 Claims, 10 Drawing Sheets

(56) References Cited

U.S. PATENT DOCUMENTS

| | | | |
|---|---|---|---|
| 9,811,838 B1 | 11/2017 | Daire et al. | |
| 9,846,086 B1 | 12/2017 | Robinson et al. | |
| 9,858,614 B2 | 1/2018 | Seaward et al. | |
| 10,133,995 B1 | 11/2018 | Reiss et al. | |
| 10,181,111 B1 | 1/2019 | Kohli et al. | |
| 10,346,889 B1 | 7/2019 | Reiss et al. | |
| 2002/0077937 A1 | 6/2002 | Lyons et al. | |
| 2002/0138350 A1 | 9/2002 | Cogen | |
| 2002/0143655 A1 | 10/2002 | Elston et al. | |
| 2002/0178074 A1 | 11/2002 | Bloom | |
| 2003/0125963 A1 | 7/2003 | Haken | |
| 2005/0058755 A1 | 3/2005 | Chambers | |
| 2005/0236478 A1 | 10/2005 | St. Clair et al. | |
| 2006/0121161 A1 | 6/2006 | Garrett | |
| 2006/0136237 A1 | 6/2006 | Spiegel et al. | |
| 2006/0235754 A1 | 10/2006 | Walker et al. | |
| 2006/0293971 A1 | 12/2006 | Hunter et al. | |
| 2007/0168118 A1 | 7/2007 | Lappe et al. | |
| 2007/0185776 A1 | 8/2007 | Nguyen et al. | |
| 2007/0192111 A1 | 8/2007 | Chasen | |
| 2008/0052163 A1 | 2/2008 | Koh | |
| 2008/0275643 A1* | 11/2008 | Yaqub | G01C 21/343 701/412 |
| 2009/0106124 A1 | 4/2009 | Yang | |
| 2009/0187488 A1 | 7/2009 | Shamilian | |
| 2009/0254445 A1 | 10/2009 | Bennett et al. | |
| 2009/0281903 A1 | 11/2009 | Blatsein | |
| 2009/0307096 A1 | 12/2009 | Antonellis | |
| 2010/0076853 A1 | 3/2010 | Schwarz | |
| 2010/0114790 A1 | 5/2010 | Strimling et al. | |
| 2011/0055046 A1* | 3/2011 | Bowen | G06Q 10/08 705/26.41 |
| 2012/0036028 A1 | 2/2012 | Webb | |
| 2012/0173308 A1 | 7/2012 | Brown et al. | |
| 2012/0197722 A1 | 8/2012 | Mesaros | |
| 2012/0203619 A1 | 8/2012 | Lutnick et al. | |
| 2012/0303425 A1 | 11/2012 | Katzin et al. | |
| 2013/0006747 A1 | 1/2013 | Wu | |
| 2013/0046605 A1 | 2/2013 | Baron et al. | |
| 2013/0054323 A1 | 2/2013 | Charles | |
| 2013/0080204 A1 | 3/2013 | Khorashadi et al. | |
| 2013/0110396 A1 | 5/2013 | Choudhury | |
| 2013/0151357 A1 | 6/2013 | Havas et al. | |
| 2013/0218727 A1 | 8/2013 | Lutnick et al. | |
| 2013/0226651 A1 | 8/2013 | Napper | |
| 2013/0246207 A1 | 9/2013 | Novak et al. | |
| 2013/0290172 A1 | 10/2013 | Mashinsky | |
| 2013/0317940 A1 | 11/2013 | Fitz | |
| 2014/0011522 A1 | 1/2014 | Lin et al. | |
| 2014/0074743 A1 | 3/2014 | Rademaker | |
| 2014/0089135 A1 | 3/2014 | Linh et al. | |
| 2014/0095311 A1 | 4/2014 | Bulloch, Jr. | |
| 2014/0164126 A1 | 6/2014 | Nicholas et al. | |
| 2014/0180953 A1 | 6/2014 | Westcott et al. | |
| 2014/0180959 A1 | 6/2014 | Gillen et al. | |
| 2014/0188637 A1 | 7/2014 | Balasubramaniam et al. | |
| 2014/0188650 A1 | 7/2014 | Sun et al. | |
| 2014/0214465 A1* | 7/2014 | L'Heureux | G06Q 50/12 705/7.13 |
| 2014/0222519 A1 | 8/2014 | Swinson et al. | |
| 2014/0226487 A1 | 8/2014 | Forssell et al. | |
| 2014/0279081 A1 | 9/2014 | Marx et al. | |
| 2014/0279667 A1 | 9/2014 | Gillen | |
| 2014/0286150 A1 | 9/2014 | Miura | |
| 2014/0297470 A1 | 10/2014 | Ramadge et al. | |
| 2014/0310196 A1 | 10/2014 | Yamamura | |
| 2014/0343841 A1* | 11/2014 | Faaborg | G01C 21/3438 701/465 |
| 2014/0370167 A1 | 12/2014 | Garden | |
| 2015/0095122 A1 | 4/2015 | Eramian | |
| 2015/0112774 A1 | 4/2015 | Georgoff et al. | |
| 2015/0178778 A1* | 6/2015 | Lee | G06Q 30/0261 705/14.58 |
| 2015/0206093 A1 | 7/2015 | Trew et al. | |
| 2015/0227888 A1 | 8/2015 | Levanon et al. | |
| 2015/0227890 A1 | 8/2015 | Bednarek et al. | |
| 2015/0262121 A1 | 9/2015 | Riel-Dalpe et al. | |
| 2015/0269521 A1 | 9/2015 | Knapp et al. | |
| 2015/0286984 A1 | 10/2015 | Dikman et al. | |
| 2015/0294265 A1 | 10/2015 | Monteverde | |
| 2015/0324717 A1 | 11/2015 | Lord et al. | |
| 2015/0324729 A1 | 11/2015 | Lord et al. | |
| 2015/0332215 A1 | 11/2015 | Wilson et al. | |
| 2015/0371317 A1 | 12/2015 | Bosko et al. | |
| 2016/0019496 A1 | 1/2016 | Gorlin | |
| 2016/0048804 A1 | 2/2016 | Paul et al. | |
| 2016/0063438 A1 | 3/2016 | Shuken et al. | |
| 2016/0071050 A1 | 3/2016 | Kaye | |
| 2016/0171591 A1 | 6/2016 | Williams et al. | |
| 2016/0196525 A1 | 7/2016 | Kantor et al. | |
| 2016/0196528 A1 | 7/2016 | Lemmon | |
| 2016/0292664 A1* | 10/2016 | Gilfoyle | G06Q 10/08 |
| 2017/0200218 A1 | 7/2017 | Napper | |
| 2018/0022405 A1 | 1/2018 | Gecchelin et al. | |
| 2018/0047242 A1 | 2/2018 | Lutnick et al. | |

OTHER PUBLICATIONS

Non-Final Office Action dated Jan. 11, 2018, for U.S. Appl. No. 14/625,683, of Kumar, A.R., et al., filed Feb. 19, 2015.

Non-Final Office Action dated Jan. 12, 2018, for U.S. Appl. No. 14/813,358, of Kohli, A., filed Jul. 30, 2015.

Non-Final Office Action dated Jan. 18, 2018, for U.S. Appl. No. 14/985,267, of Rhodes, M., et al., filed Dec. 30, 2015.

Non-Final Office Action dated Jan. 26, 2018, for U.S. Appl. No. 14/838,446, of Kohli, A., filed Aug. 28, 2015.

Non-Final Office Action dated Nov. 9, 2017, for U.S. Appl. No. 14/625,673, of Reiss, J.L., et al., filed Feb. 19, 2015.

Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.

Kauffman, R.J., and Wang, B., "Bid Together, Buy Together: On the Efficacy of Group-Buying Business Models in Internet-Based Selling," Carlson School of Management, last revised on May 16, 2001, pp. 1-44.

Non-Final Office Action dated May 26, 2015, for U.S. Appl. No. 14/625,680, of Kumar, A.R., et al., filed Feb. 19, 2015.

Non-Final Office Action dated Jun. 24, 2015, in U.S. Appl. No. 14/663,671, of Reiss, J. L., et al., filed Mar. 20, 2015.

Notice of Allowance dated Nov. 6, 2015, for U.S. Appl. No. 14/625,680, of Kumar, A.R., et al., filed Feb. 19, 2015.

Final Office Action dated Dec. 24, 2015, in U.S. Appl. No. 14/663,671, of Reiss, J. L., et al., filed Mar. 20, 2015.

Advisory Action dated Mar. 9, 2016, in U.S. Appl. No. 14/663,671, of Reiss, J. L., et al., filed Mar. 20, 2015.

Non-Final Office Action dated Oct. 6, 2016, for U.S. Appl. No. 14/663,671, of Reiss, J.L., et al., filed Mar. 20, 2015.

Notice of Allowance dated Dec. 22, 2016, for U.S. Appl. No. 14/663,671, of Reiss, J.L., et al., filed Mar. 20, 2015.

Non-Final Office Action dated Apr. 3, 2018, for U.S. Appl. No. 14/926,056, of Bernstein, B.R., et al., filed Oct. 29, 2015.

Non-Final Office Action dated Feb. 1, 2018, for U.S. Appl. No. 14/993,149, of Kohli, A., et al., filed Jan. 12, 2016.

Non-Final Office Action dated Feb. 28, 2018, for U.S. Appl. No. 14/642,875, of Reiss, J.L., et al., filed Mar. 10, 2015.

Notice of Allowance dated Jun. 25, 2018, for U.S. Appl. No. 14/625,673, of Reiss, J.L., et al., filed Feb. 19, 2015.

Non-Final Office Action dated Jul. 13, 2018, for U.S. Appl. No. 14/710,808, of Reiss, J.L., et al., filed Oct. 29, 2015.

Notice of Allowance dated Sep. 6, 2018, for U.S. Appl. No. 14/993,149, of Kohli, A., et al., filed Jan. 12, 2016.

Final Office Action dated Oct. 17, 2018, for U.S. Appl. No. 14/926,056, of Bernstein, B.R., et al., filed Oct. 29, 2015.

Final Office Action dated Nov. 16, 2018, for U.S. Appl. No. 14/813,358, of Kohli, A., filed Jul. 30, 2015.

(56) References Cited

OTHER PUBLICATIONS

Notice of Allowance dated Feb. 25, 2019, for U.S. Appl. No. 14/710,808, of Reiss, J.L. et al., filed May 13, 2015.
EIC 3600 Search Report dated Feb. 25, 2019, for U.S. Appl. No. 14/710,808, of Reiss, J.L. et al., filed May 13, 2015.
Non Final Office Action dated Apr. 4, 2019, for U.S. Appl. No. 14/813,358, of Kohli, A., filed Jul. 30, 2015.
Advisory Action dated Jan. 29, 2019, for U.S. Appl. No. 14/926,056, of Bernstein, B.R., et al., filed Oct. 29, 2015.
Non Final Office Action dated Jul. 30, 2019, for U.S. Appl. No. 15/496,040, of Reiss, J.L., et al., filed Apr. 25, 2017.

* cited by examiner

SYSTEMS, METHOD, AND COMPUTER-READABLE MEDIA FOR ESTIMATING TIMING FOR DELIVERY ORDERS

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. However, if a customer is not at the delivery location when placing the order, the customer needs to try to get to the delivery location before the courier delivers the food. For instance, if the customer is not at the delivery location when the courier arrives, the courier may not deliver the food, or may leave the food outside or in an otherwise unsuitable location that may reduce the food quality.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
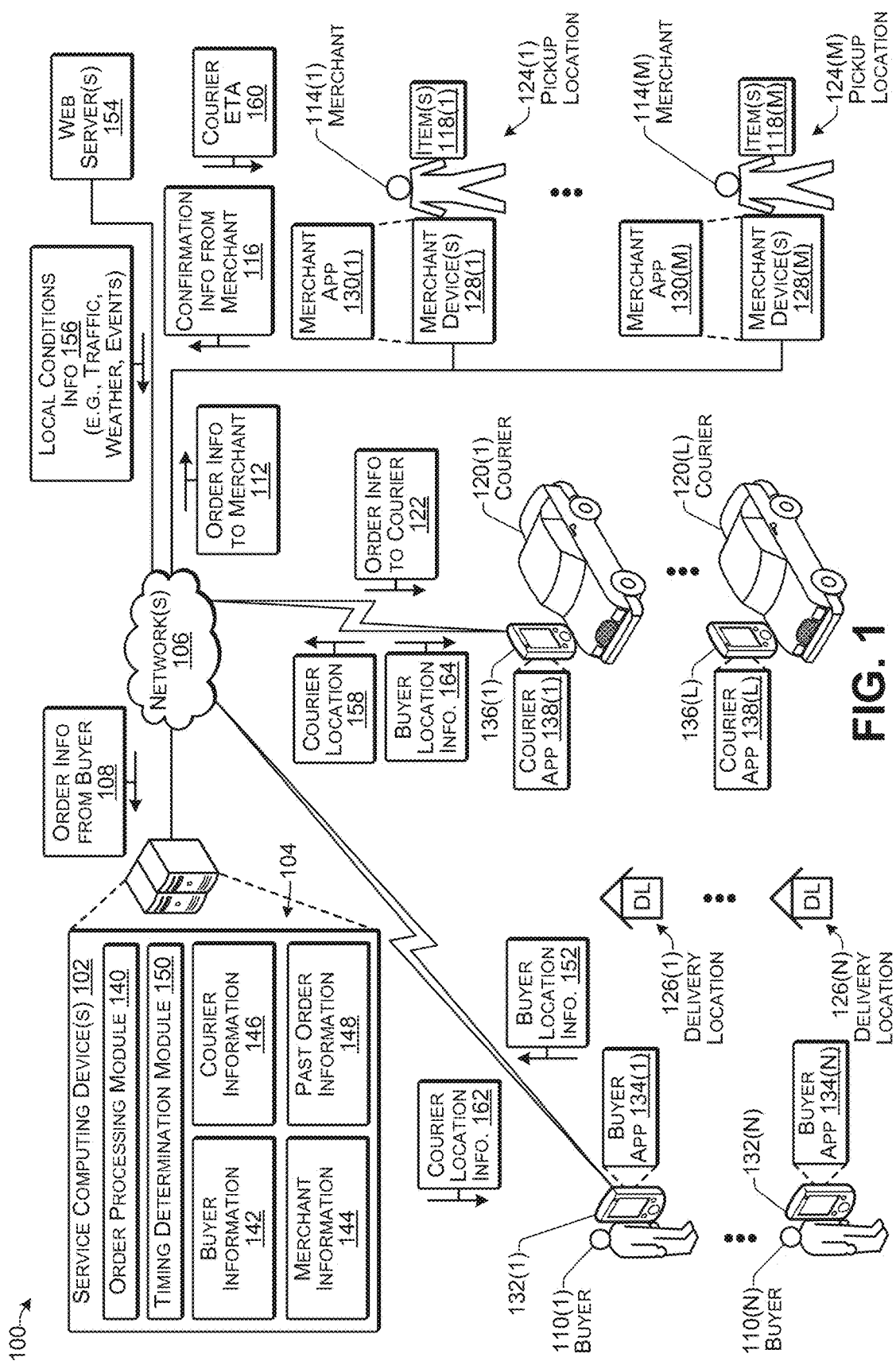
FIG. 1 illustrates an example system and environment for providing delivery based on timing estimates according to some implementations.

The technology herein provides a novel system and environment in which an order may be timed to be delivered to a buyer in the freshest possible condition as soon as the buyer arrives at a delivery location. Further, the buyer may not be constrained to travel to the delivery location at any set time, and the order may still be timed to arrive at approximately the same time as the buyer. Thus, implementations herein include a new type of delivery system and service that has not been contemplated or achieved by conventional delivery services.

As an example, a buyer, who is at a first location, may use a buyer device to place an order with a merchant for delivery of an item to a second location that is remote or otherwise different from the first location. Following placement of the order, the buyer device may periodically send location information to a service provider based on information from a GPS (Global Positioning System) receiver or other location sensor included in the buyer device. The service provider may track movement of the buyer toward the delivery location and may determine an estimated time of arrival (ETA) of the buyer at the delivery location based at least in part on the detected buyer movement, local traffic conditions between the buyer's location and the delivery location, and/or other local conditions, such as weather, local events taking place, and the like. Based on the buyer ETA, the service provider may arrange to have a courier deliver the order to the delivery location at a time that approximately coincides with the buyer ETA (e.g., within plus or minus 5 minutes). Further, the service provider may determine a preparation time for the ordered item and an estimated travel time for a courier to travel from the merchant location to the delivery location. The service computing device may instruct the merchant to begin preparation of the order at a time when the item preparation time plus the courier travel time to the delivery location is approximately equal (or within a threshold time, e.g., 5 minutes) to the amount of time until the buyer is estimated to arrive at the delivery location.

Additionally, some implementations herein provide technological innovations that enable people to participate as couriers in a new type of crowdsourced service economy. With the technology herein, essentially any person with a mobile device is able to immediately become a courier, or cease to be a courier, in a courier network that provides delivery services for delivery of items from merchants to buyers. Additionally, through the interaction of a plurality of computing devices, mobile devices, and location sensors, implementations herein are able to track the movement of couriers throughout a service region over time, and can use this information to determine a first courier ETA at which a particular courier is estimated to arrive at a particular merchant location to pick up an order, and further to determine a second courier ETA at which the particular courier is estimated to arrive at a particular delivery location to deliver the order to the buyer. For instance, the first courier ETA for the courier to arrive at the merchant location may be provided to the merchant so that the merchant can have the order ready for pickup. Further, the second courier ETA for the courier to arrive at the delivery location may be provided to the buyer. Similarly, the buyer ETA to the delivery location may be provided to the courier. In some cases, the information gained from tracking courier movements over time can also be applied to determining the buyer ETA if the buyer is traveling in a car.

Furthermore, some examples described herein include techniques and arrangements for determining estimated timing for delivery orders based at least in part on regional conditions, buyer delivery location, merchant pickup location, and courier and buyer movement information. For instance, a service provider may provide a delivery service that enables buyers to order items, such as food items or other goods from merchants, such as restaurants. When placing an order with a merchant, the buyer may use a buyer application on a buyer device, such as a mobile device or other computing device, to browse through the items available from various different merchants. The buyer may select a particular item to order from a particular merchant and the service may send information about this selection to the particular merchant. Further, the service may arrange for a courier to pick up the ordered item from the merchant and deliver the item to the delivery location specified by the buyer.

In some examples, a buyer at a first location indicates that a second location is a desired delivery location, and further indicates that the buyer would like the courier to deliver the order upon the buyer's arrival at the delivery location. For instance, the buyer may indicate an approximate desired delivery time, or at least a delivery day, and the service computing device may determine the buyer travel time from the buyer's current location to the delivery location. For example, based on the buyer's location, speed of travel, patterns of stopping and starting movement, and the like, the service computing device may determine whether the buyer is walking, biking, taking mass transit, driving, or the like. Based on this determination, the buyer's progress over time, and other factors, as discussed below, the service computing device may determine the buyer's ETA to the delivery location.

Further, the service computing device may determine the courier travel time from the merchant's pickup location to the delivery location, such as based on map information, current traffic conditions, and other local conditions. The service computing device may further determine the preparation time for the item selected by the buyer. For instance, the preparation time may be provided by the merchant, or may be determined based on past orders for the item and/or past orders from the merchant. When the item preparation time plus the courier travel time from the merchant to the delivery location is substantially equal to the amount of time until the buyer ETA, the service computing device may instruct the merchant to begin preparation of the item, and may further provide the merchant with a courier ETA for picking up the item.

As mentioned above, the courier ETA to the merchant and the courier ETA to the delivery location may be calculated in part based on local conditions. For example, an estimated courier travel time from a particular merchant pickup location to a particular delivery location may be shorter in the mid-afternoon when traffic is typically light, and may be longer after rush hour starts, such as due to heavy traffic causing the courier to travel more slowly. In some cases, the travel time from a particular merchant location (or from a particular buyer location) to a particular delivery location may be determined based on map information and current or predicted traffic conditions, as well as weather conditions, local events or street closures, local construction, tolls, geological features, and so forth. The travel time for a courier to get to the merchant pickup location, e.g., from a location at which the courier first receives a delivery assignment, may be similarly calculated.

In some examples, the service provider may receive, from a courier device, a first indication of the time at which the courier picks up the order at the pickup location, and a second indication of a time at which the courier delivers the order to the delivery location. The service may adjust the technique for determining the courier travel times based on the feedback received from the courier devices over a period of time, i.e., based on the differences between the predicted courier travel times and actual courier travel times. Further, the courier fleet may include a large number of couriers who may also serve as sensors to indicate current traffic conditions in the local region. Additionally, the courier fleet may also provide information that may be used to predict delivery times based on comparing local conditions during past deliveries with current conditions during a current delivery.

In some examples, the service may rely at least in part on historic order information to determine the courier ETAs and, in some cases, the buyer ETAs. Thus, the service may determine, for a plurality of different times of day for a plurality of different days, and for a plurality of orders received for items provided by individual merchants over a past period of time, e.g., a past month, past two months, past year, etc., the actual travel times for couriers who delivered orders, and actual travel times of buyers in various parts of a service region. Thus, at a current time, the service may receive a communication from a buyer application on a buyer device that includes an order for an item and an indication of a delivery location. Based on these inputs, the service may arrange for a courier to deliver the order to the delivery location contemporaneously with the buyer's arrival at the delivery location. Further, the buyer application on the buyer device may track the buyer as the buyer proceeds toward the delivery location, and may periodically send location information to the service computing device. Based in part on this location information, the service computing device can arrange for proper timing of the order preparation and delivery so that the buyer receives the order at the delivery location in the freshest possible condition and to coincide with the buyer's arrival to the delivery location.

As used herein, an order may include a request submitted by a buyer (e.g., a customer) for the acquisition of food items and/or other goods (referred to herein as items) from a merchant. The order information may be received by the service and sent to the merchant. For example, a merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service may receive payment from a buyer for an order and the service may provide payment to the merchant for the order. Further, the service may provide payment to the courier for delivering the order.

For discussion purposes, some example implementations are described in the environment of enabling buyers to place orders with merchants for delivery to a delivery location that is remote from the buyer's current location. The order preparation and delivery may be timed for delivering the order to the delivery location at a time that approximately coincides with the buyer's arrival at the delivery location. However, implementations herein are not limited to the particular examples provided, and may be extended to other service environments, other system architectures, other types of goods, other conditions, and so forth, as will be apparent to those of skill in the art in light of the disclosure herein.

FIG. 1 illustrates an example environment 100 enabling delivery timing management according to some implementations. The environment 100 includes one or more service computing devices 102 of a service provider 104 that may receive, over one or more networks 106, order information 108 from a plurality of buyers 110(1)-110(N). The order information 108 may include information about at least one order placed by at least one of the buyers 110. Based on the order information 108 received from a particular buyer 110, the service computing device 102 may send order information 112 to a particular merchant 114 of a plurality of merchants 114(1)-114(M). The particular merchant 114 may receive the order information 112, and may respond with confirmation information 116 to confirm that the particular order has been received and will be prepared by the particular merchant 114.

In some examples, the order information 112 sent to the merchant 114 may identify at least one item 118 ordered by the buyer 110 from the particular merchant 114. For instance, each merchant 114(1)-114(M) may offer one or more respective items 118(1)-118(M), which may be ordered by buyers 110 for delivery. In some cases, the order information 112 may also specify a time at which the order is to be picked up by a courier 120 of a plurality of couriers 120(1)-120(L). For instance, the confirmation information 116 sent by the merchant 114 to the service computing device 102 may confirm the pickup time specified by the service computing device 102. In other cases, the order information 112 sent to the merchant 114 may include an inquiry as to how long the preparation time for the order will be, and the merchant 114 may include, with the confirmation information 116 an indication of the preparation time for the item(s) ordered. In some examples, the order information 112 may instruct the merchant to wait to prepare the order, such as in the cases that the buyer's ETA at the delivery location is greater than a threshold time. For instance, the threshold time may be based at least in part on the item preparation time plus the courier travel time from the merchant location to the delivery location.

In response to receiving the confirmation information 116 from the particular merchant 114, the service computing device 102 may send order information 122 to a particular courier 120 who will pick up the order from the particular merchant 114 and deliver the order to the buyer 110 who placed the order. For instance, each merchant 114(1)-114(M) may be associated with a respective pickup location 124(1)-124(M), which may typically be the merchant's place of business. Furthermore, the buyers 110(1)-110(N) may specify respective delivery locations 126(1)-126(N) to which the orders are to be delivered, and the respective delivery locations 126(1)-126(N) may be remote from the locations at which the buyers place the respective orders.

The order information 122 sent to a particular courier 120 may include the pickup location 124 for the order, the pickup time, and the delivery location 126 for the order. In some examples, the order information 122 may further include an estimated delivery time, e.g., a time at which the service provider 104 estimates the buyer will arrive at the delivery location 126 and at which time the ordered item is to be delivered to the buyer 110 at the delivery location 126. Further, in some cases, the order information 122 may include an amount that the courier 120 will be paid if the courier 120 accepts the delivery job, and/or other information related to the order.

In the illustrated example, the service computing device 102 is able to communicate with merchant devices 128(1)-128(M) over the one or more networks 106. Each merchant device 128(1)-128(M) may be associated with a respective merchant 114(1)-114(M). Each merchant device 128(1)-128(M) may be a computing device, such as a desktop, laptop, tablet, smart phone, or the like, and may include a respective instance of a merchant application 130(1)-130(M) that executes on the respective merchant device 128(1)-128(M). For example, the merchant application 130 may be configured to communicate with the service computing device 102, such as for receiving the order information 112 and for sending the confirmation information 116. In some examples, the merchant application 130 and the service computing device 102 may communicate with each other via one or more application programming interfaces (APIs). Further, the merchant device 128 may include one or more output devices, such as speakers (not shown in FIG. 1), that the merchant application 130 may use to audibly notify the respective merchant 114 that an order has been received. Additionally, or alternatively, the merchant device 128 may include a display (not shown in FIG. 1) that the merchant application 130 may use for presenting the order information 112 to the merchant 114. For instance, the merchant application 130 on the merchant device 128 may present the order information 112 in one or more graphic user interfaces (GUIs).

In some examples, the merchant application 130 may provide point-of-sale (POS) functionality to the merchant device 128 to enable the merchant 114 to accept payments using the merchant device 128. Alternatively, in some examples, the merchant device 128 may be a fax machine and the merchant 114 may receive the order information 112 via a facsimile transmission from the service computing device 102. As still another example, the merchant device 128 may be a computing device that is configured to receive order information via email, instant messaging, or other electronic communication. As still another example, the merchant device 128 may include a phone, and the merchant device 128 may receive the order information 112 via an SMS text message, voicemail, telephone call, or the like.

In addition, the buyers 110(1)-110(N) may be associated with respective buyer devices 132(1)-132(N) that may execute respective instances of buyer applications 134(1)-134(N). For example, buyers 110 may use buyer devices 132, such as smart phones, mobile devices, tablet computers, wearable computing devices, or the like, and these buyer devices 132 may have installed thereon the buyer application 134 and may further include one or more location sensors, such as a GPS device (not shown in FIG. 1) and/or other sensors. The buyer application 134 may enable a particular buyer 110 to select one or more of the items 118 to purchase from one or more of the merchants 114 to be delivered to a particular delivery location 126 by one or more of the couriers 120. For example, the buyer application 134 may present one or more GUIs on a display for enabling the buyer 110 to select one or more of the items 118 for an order.

Further, the buyer application 134 may enable the buyer 110 to place an order from a merchant 114 in advance, such as for receiving delivery of the order at the delivery location at a later time, e.g., on the same day. For instance, the buyer 110 may be able to place an order through the buyer application 134 to have lunch delivered at a specified delivery location and/or to have dinner delivered to a specified location. The service provider 104 may track the location of the buyer 110 and may have the order delivered to the buyer at the delivery location 126 when the buyer 110 arrives at the specified delivery location 126.

The buyer application 134 may further enable the buyer 110 to make a payment for an order using the buyer application 134. For instance, the service provider 104 may charge a buyer account associated with the buyer 110 for an amount associated with a particular order. In some examples, the buyer application 134 and the service computing device 102 may communicate with each other via one or more APIs. Additionally, or alternatively, the buyer application 134 may be a web browser, or the like, and the buyer 110 may navigate to a website associated with the service provider 104, and may use the website associated with the service provider 104 to place an order. Thus, in this case, the website may provide at least some of the functionality attributed to the buyer application herein.

In addition, the couriers 120(1)-120(L) may be associated with respective courier devices 136(1)-136(L) that may execute respective instances of courier applications 138(1)-138(L). For example, couriers 120 may use courier devices 136, such as smart phones, tablet computers, wearable computing devices, laptops, or the like, and these courier devices 136 may have installed thereon the courier application 138. The courier application 138 may be configured to receive the order information 122 from the service computing device 102 to provide a particular courier 120 with information for picking up a particular order from a merchant's pickup location 124 and for delivering the order to a buyer delivery location 126. The courier application 138 may further enable the courier 120 to respond to the service computing device 102 to confirm acceptance of a delivery job.

Additionally, in some cases, the courier application 138 may provide the service computing device 102 with an indication of a current location of a particular courier 120. For instance, one or more location sensors associated with each courier device 136 of an active courier 120 may provide location information and, based on this, the courier application 138 may send location information to the service computing device 102, such as by providing an indication of a respective geographic location of the courier device. Thus, a subset of courier devices 136 associated with active couriers may communicate with the service computing device 102, and may send location information obtained from one or more location sensors associated with each courier device 136, such as a GPS receiver (not shown in FIG. 1).

In some cases, another subset of courier devices 136 associated with the inactive couriers may be periodically pinged by the service computing device 102 to determine interest in becoming active and, if so, requesting current location information of the associated inactive courier. Couriers who are interested in being activated may allow their courier devices 136 to respond with their location information, while those who are not interested in being activated may keep their location information private by not responding. In some examples, the courier application 138 and the service computing device 102 may communicate with each other via one or more APIs. Alternatively, in other examples, the courier device 136 may receive the order information 122 via an SMS text message, a voicemail, a telephone call, or the like.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network, including fiber optics and Ethernet; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 128, the buyer devices 132, and/or the courier devices 136 are able to communicate over the one or more networks 106 using wired or wireless connections, and combinations thereof.

In the illustrated example, the service computing device 102 includes an order processing module 140 that may be executed on the service computing device 102 to provide, at least in part, the order processing functionality attributed to the service computing device 102. The order processing module 140 may receive the order information 108 from the buyers 110 and may associate the order information 108 with buyer information 142 and merchant information 144. For instance, based on buyer identifying information that may be included with the order information 108, the order processing module 140 may associate particular order information 108 with a particular buyer account. The order processing module 140 may access a buyer account included in the buyer information 142 to charge a particular buyer account for a particular order.

Furthermore, based on a particular merchant 114 identified by the order information 108, the order processing module 140 may associate the order information 108 with a merchant account of a particular merchant. The order processing module 140 may access the merchant account to determine contact information for sending the order information 112 to the correct merchant device 128 so that the particular merchant can receive and provide confirmation of the order. The order processing module 140 may further access the merchant account of the particular merchant to credit payment to the particular merchant that prepares the order.

In addition, the order processing module 140 may access courier information 146 to determine courier contact information for sending the order information 122 to a particular courier 120 of the plurality of couriers 120(1)-120(L) to determine whether the particular courier 120 is willing to accept the delivery job of delivering the order to the buyer. The particular courier 120 may use the courier application 138 on the courier device 136 to receive a message with information about the order, and to respond with acceptance of the delivery job if the job assignment is accepted. The particular courier 120 may subsequently pick up the order from the particular merchant 114 and deliver the order to the particular buyer 110 at a specified delivery location 126 and according to a timing for pickup and delivery that may be specified by the service provider 104. When the courier 120 has completed delivery of the order to the delivery location 126, the courier 120 may use the courier application 138 to inform the order processing module 140 that the delivery has been completed. The order processing module 140 may access a courier account included in courier information 146 for the particular courier 120 to credit the courier account of the particular courier 120 with payment for the delivery job.

The order processing module 140 may store information associated with each order as past order information 148. For instance the past order information 148 may include a day of the week, date, and time of day at which each order is received from the respective buyer 110. The past order information 148 may further include, for each order: merchant identifying information; buyer identifying information; items ordered; the pickup location 124; the delivery location 126; preparation time for the order; location of the courier when the courier accepted the job for delivery of the order; predicted spoilage time for one or more items; time that the order was picked up by the courier; time that the order was delivered; amount paid for the order; buyer feedback; as well as other information, as discussed additionally below.

The service computing device 102 may further include a timing determination module 150 that may be executed by the service computing device 102 to determine respective item preparation timings for the merchants, and pickup and delivery timings for the couriers based at least in part on an estimated travel time between the respective merchant pickup locations and the delivery location, buyer ETA, courier ETAs, and conditions within the service region. For example, when placing an order for an item 118 from a particular merchant 114, the buyer 110 may use the buyer application 134 to place the order. The buyer application 134 may present a GUI on the buyer device 132 that enables the buyer 110 to browse through the items available from various different merchants. Prior to presenting the merchant information in the GUI, the buyer application 134 may receive, from the service computing device 102, merchant and item information for the various merchants from which the buyer is able to select, including information about various items offered by the merchants. The listing of items can include, for each item, an item name, description, cost, one or more customization options, and the like.

As an example, when the buyer opens or otherwise accesses the buyer application 134, the buyer application 134 may initially request that the buyer indicate a desired delivery location 126, as well as provide an indication of at least the day on which delivery is desired. The buyer application 134 may send this information to the service computing device 102. In some cases, the buyer 110 may enter an address as the delivery location, may proceed with a default address, may select a previously used address, or the like. Further, the buyer application 134 may, by default, assume that the buyer is interested in ordering now for immediate delivery, i.e., the order will be delivered to the delivery location 126 specified by the buyer 110 at a timing to coincide with the buyer's arrival at the delivery location 126, or within a few minutes thereafter. Of course, if the buyer 110 prefers a different delivery time or date, the buyer 110 may select one or more options in the GUI to select a different delivery time or day.

In some examples, the buyer device 132 is configured to communicate, to the service computing device 102, buyer location information 152 that describes a geographic location of the buyer device 132. The timing determination module 150 may be configured to determine, based on the received location information 152, a buyer travel distance from the buyer's current geographic location to a geographic location of the delivery location 126 and/or a buyer ETA for reaching the geographic location of a delivery location. In addition to communicating the buyer's location at the time of placing the order, buyer device 132 may be configured to also communicate the buyer location information 152 to the service computing device periodically, e.g., at specified or unspecified time intervals, e.g., every 10 seconds, every 30 seconds, every minute, etc., and/or whenever a threshold level of acceleration or deceleration is detected, or the like. Alternatively, in some examples, the timing determination module 150 may periodically poll the buyer device 132 for the location information 152. Accordingly, the timing determination module 150 may track movement of the buyer toward the delivery location, and may determine a buyer ETA to the delivery location. Further, the timing determination module 150 may update the buyer ETA depending on whether the buyer makes a stop along the route, changes routes, changes modes of transportation, or the like. Additionally, in some cases, the buyer device 132 may send other sensor information to the timing determination module 150, such as accelerometer information. For instance, the accelerometer information may indicate patterns in buyer movement that may enable the timing determination module 150 to determine what type of transportation the buyer is using to travel to the delivery location 126.

Based at least in part on the received information regarding the delivery location and the buyer's current position, the timing determination module 150 may determine an initial buyer ETA. In some examples, the buyer may provide an indicated ETA with the order, for example, the buyer may indicate that he or she will be at the delivery location around 6:00 PM. In other examples, the buyer might not provide an indicated ETA, and may rely on the service provider to determine when the buyer will arrive at the delivery location.

As discussed below, the timing determination module 150 may determine the delivery timings based on a number of considerations. For instance, the timing determination module 150 may take into consideration the past order information 148 and various other factors, such as traffic, weather, local events, date, seasonal variations, etc. As one example, the timing determination module 150 may access one or more web servers 154 or other databases over a network, or other sources of information, to obtain local conditions information 156, such as traffic, weather, local events, road closures, construction, and the like, for a current or future day. As another example, current traffic conditions may be determined based in part on courier location information 158 received from the courier devices 136, such as by tracking movement of the courier devices 136 within the service region over time through location information received from the GPS receiver onboard each courier device 136, or the like. For instance, the courier device 136 may be programmed by the courier application 138 to periodically report a current location to the service computing device 102, or the service computing device may periodically poll the courier devices 136.

Based at least in part on these considerations, the timing determination module 150 may predict estimated courier travel times between pickup locations 124 of merchants and delivery locations 126 specified by respective buyers 110. Additionally, the timing determination module 150 may predict the courier travel time from a courier starting location to a particular merchant pickup location 124 such as when assigning a delivery job to a particular courier. In addition, the timing determination module 150 may predict the buyer ETA based on the local conditions, and based on detecting patterns in the buyer's movement to detect the buyer's mode of transportation, speed of travel, and the like. Accordingly, as discussed additionally below, the timing determination module 150 may send an instruction to the merchant device 128 to instruct the merchant 118 to begin preparation of a particular order based on a prediction of the buyer ETA, and further based on predictions of a courier ETA at the merchant and/or a courier ETA when traveling from the merchant pickup location 124 to the delivery location 126. For instance, the timing determination module 150 may send, to a particular merchant device 128, an indication of the courier ETA 160 and/or courier location information to indicate to the merchant the time at which the courier may be expected to pick up the order from the merchant's pickup location. Additionally, the timing determination module 150 may send a communication to the buyer to let the buyer know that the merchant has begun preparation of the order, and may further provide to the buyer the ETA of the courier to the delivery location 126.

In addition, after the courier 120 has picked up the order from the merchant, the courier 120 may proceed towards the delivery location 126. The timing determination module 150 may continually recalculate the ETA of the buyer to the delivery location 126 and the ETA of the courier to the delivery location 126. Furthermore, the timing determination module 150 may send, to the buyer device 132, courier location information 162, which may include a location of the courier traveling toward the delivery location 126 and/or the courier ETA to the delivery location 126. Similarly, the timing determination module 150 may send, to the courier device 136, buyer location information 164, which may include a location of the buyer in relation to the delivery location, and the buyer ETA to the delivery location 126.

Figure 2:
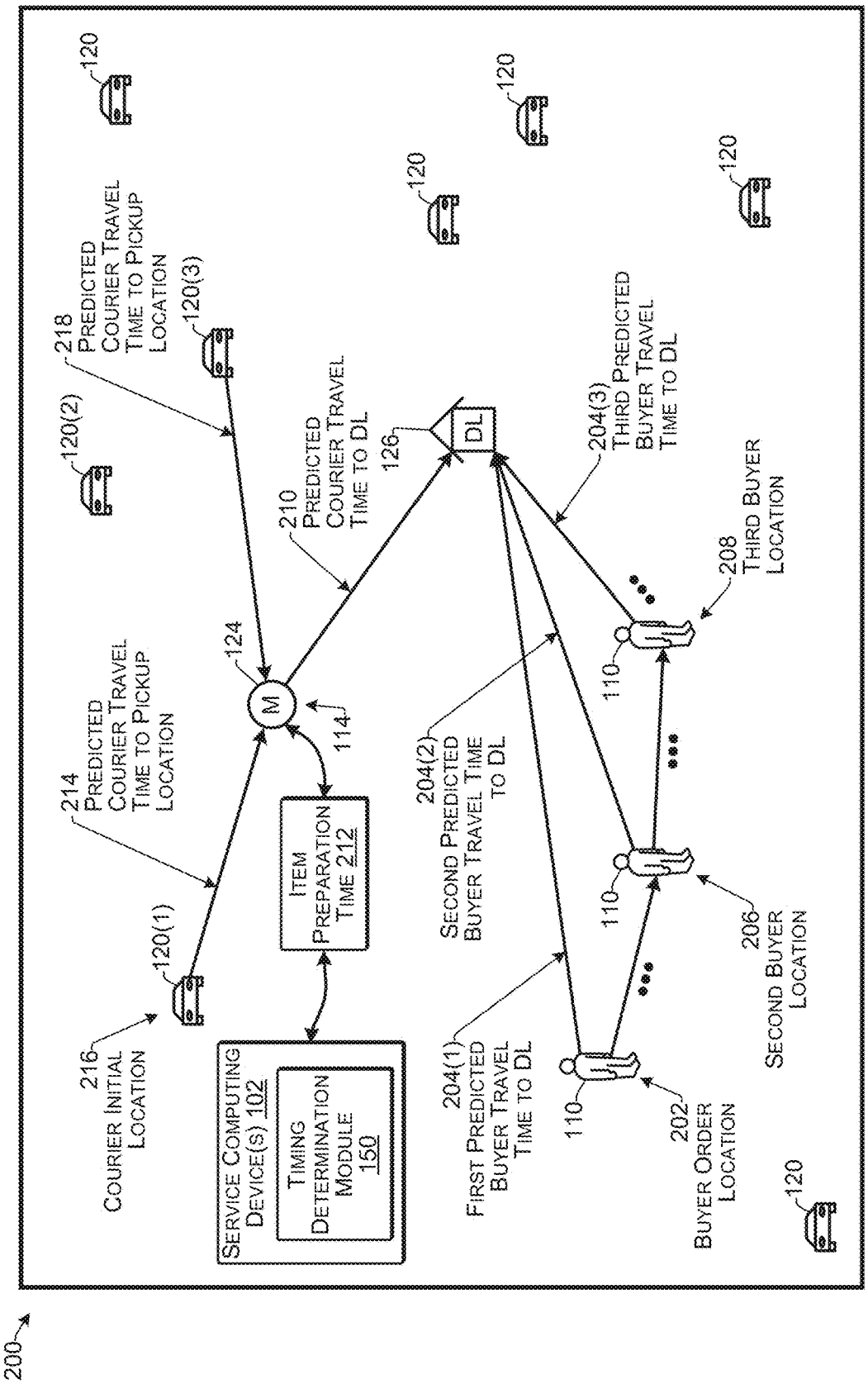
FIG. 2 illustrates an example of delivery based on timing estimates according to some implementations.

FIG. 2 illustrates an example of determining delivery timings according to some implementations. In the illustrated example, suppose that a rectangle 200 represents at least a portion of a service region. For instance, a service region may be a geographic area that encompasses delivery locations of buyers and pickup locations of merchants. Within the illustrated portion of the service region reside a merchant pickup location 124 associated with a merchant 114, and a delivery location 126 associated with a buyer 110.

In this example, suppose that the buyer 110 places an order with the merchant 114 for delivery to the delivery location 126. Furthermore, suppose that at the time of placing the order, the buyer 110 is at a buyer order location 202 that is remote from the delivery location 126. In response to receiving the order from the buyer 110, the timing determination module 150 may determine a first predicted buyer travel time 204(1), and based at least in part on the first predicted travel time 204(1), may determine a first buyer ETA to the delivery location 126. The timing determination module 150 may continually receive buyer location information from the buyer device, such as every 10 seconds, every 30 seconds, every minute, every 2 minutes etc., and may continually update the predicted buyer travel time and the predicted buyer ETA based on the received buyer location information. For instance, when the buyer 110 is at a second buyer location 206, the timing determination module 150 may determine a second predicted buyer travel time 204(2) to the delivery location, and when the buyer 110 is at a third buyer location 208, the timing determination module 150 may determine a third predicted buyer travel time 204(3) to the delivery location 126. Furthermore, while only three buyer locations 202, 206 and 208 are illustrated in this example for clarity, the actual number of ETA calculations performed by the timing determination module 150 may be a great deal more. For example, the timing determination module 150 may calculate a new buyer ETA for the buyer 110 every time location information is received from the buyer device, such as every 10 seconds, every 30 seconds, every minute, every 2 minutes, etc., and/or whenever acceleration of the buyer device exceeds a threshold level, or the like, which may indicate starting, stopping, or other actions by the buyer. Accordingly, the timing determination module 150 may continuously track the buyer's progress toward the delivery location 126. Various techniques for determining the buyer ETA to the delivery location 126 based on buyer location, speed of travel, local conditions, and the like, are discussed additionally below.

Further, there may be a plurality of couriers 120 in the service region. In some examples, the movements of the couriers 120 within the service region may be tracked by the timing determination module 150, such as for determining current traffic conditions within the service region and/or for determining actual courier travel times between a pickup location and a delivery location. This information may be used, at least in part, for predicting courier travel times within the service region, which may be used at least in part for determining the delivery timings.

The timing determination module 150 may determine, based in part on geographic distance, and further based in part on local conditions, a predicted courier travel time 210 from the merchant pickup location 124 to the delivery location 126. Further, the timing determination module 150 may obtain from the merchant, may determine from past order information, or may access in storage, an item preparation time 212 for the item ordered by the buyer. The timing determination module 150 may compare the total of the item preparation time 212 plus the predicted courier travel time 210 to the delivery location to determine a first threshold time at which preparation of the order should begin.

As an example, suppose that the merchant is a restaurant named The Fish Restaurant, and further suppose that the buyer ordered caviar with blinis and crème fraiche from The Fish Restaurant. Further, suppose that the order has a preparation time of 7 minutes and further suppose that the courier travel time from The Fish Restaurant to the delivery location, e.g., the buyer's home in this example, is 5 minutes. Accordingly, the first threshold time in this example is 7+5=12 minutes. Additionally, in this example, suppose that a courier travel time 214, from an initial courier location 216, to the merchant pickup location 214, plus a buffer time to allow the courier to go into the merchant's store to pick up the item, is less than the item preparation time. For instance, suppose that the courier travel time 214 to the merchant pickup location is 3 minutes and the buffer time is 3 minutes, for a total of 6 minutes, which is less than the item preparation time of 7 minutes. Accordingly, in this case, a first courier 120(1) may be assigned to deliver the order after the merchant has begun preparation of the item.

The timing determination module 150 may continually compare the first threshold time with the predicted buyer travel time 204 to the delivery location 126. When the predicted buyer travel time 214 to the delivery location 126 is approximately the same as the first threshold time, the timing determination module 150 may send an instruction to the merchant 214 to begin preparation of the order. In addition, the timing determination module 150 may send a message to the buyer device to notify the buyer 110 that preparation of the buyer's order has begun, and may further provide to the buyer the courier ETA for delivering the order to the delivery location 126. For example, the courier ETA may be determined based on the remaining preparation time 212 plus the predicted courier travel time 210 to the delivery location.

Thus, in the caviar example discussed above, the first threshold time is 12 minutes, so when the timing determination module 150 determines that the buyer is approximately 12 minutes from the delivery location 126, the timing determination module 150 may send an instruction to The Fish Restaurant to begin preparation of the buyer's order, and may further send a message to the buyer device to let the buyer know that the buyer's order is being prepared and that the ETA of the courier is 12 minutes. Of course, an actual time, e.g., 6:01 PM may be provided rather than or in addition to the number of minutes remaining In addition, the timing determination module 150 sends a message to the first courier 120(1) to assign the delivery job to the first courier 120(1). In response, the first courier 120(1) may begin to travel toward the merchant pickup location 124.

As alternative example, suppose that the first courier 120(1) is further away from the pickup location, such as 8 minutes away, when the buyer places the order at the buyer order location 202. Accordingly, taking into consideration the buffer time (e.g., 3 minutes), the courier travel time, plus the buffer time (8+3=11 minutes) is greater than the item preparation time (7 minutes). In this case, implementations herein may apply a second threshold time for determining when to assign a courier to deliver the order. For instance, it is undesirable to assign a courier to a delivery job too soon, as the buyer may stop along the way, may take longer than anticipated, or the like. This may result in the courier having to wait for an indeterminate amount of time until the buyer begins traveling toward the delivery location again.

Accordingly, in some examples, the second threshold time may be determined based on locations of the various couriers 120 within the service region in comparison with the buyer ETA. For instance, the second threshold time may include the buffer time, e.g., 3 minutes, to give the courier time to go into the merchant's location and pick up the order. Further, the second threshold time may include the predicted courier travel time 214 to the pickup location 124 from the courier initial location 216 when the courier is assigned to deliver the order to the delivery location 126. Thus, the second threshold time may be calculated as the courier travel time 214 to the pickup location, plus the buffer time, plus the courier travel time 210 to the delivery location (e.g., 8+3+5=16 min.) in this example. The second threshold time is used to determine when to assign the courier to the delivery job. The first threshold time may still be used to determine when to start preparation of the buyer's order. As mentioned above, the second threshold time may be used when the courier travel time 214 to the pickup location plus the buffer time is greater than the item preparation time 212. On the other hand, if the item preparation time 212 is greater than the courier travel time 216 to the pickup location plus the buffer time, then the second threshold time might not be used since the courier might be assigned immediately after the preparation of the item has begun. An exception would be in the case of that the preparation time is extremely lengthy, in which case the second threshold time may be used for determining when to assign a courier.

For instance, in the caviar example above, suppose that the buyer ETA to the delivery location is 20 minutes when the buyer is at the second buyer location 206. Accordingly, preparation of the order may not have yet begun since the buyer is more than 12 minutes away. Further, a courier may not yet have been assigned since the buyer is more than 16 minutes away. Further, suppose that the buyer 110 stops off at a store or other location at the second buyer location 206, such as to make a purchase, perform an errand, talk to a friend, or the like. As an example, suppose that the buyer runs into a friend at the store, loses track of time, and talks for 15 minutes. Therefore, it would not be efficient to have already assigned a courier 120 to deliver the item since it is unknown how long the buyer will take while running the errand or talking to the friend. Subsequently, the buyer 110 may resume travel toward the delivery location 126, and when the timing determination module 150 determines that the buyer is approximately 16 minutes from the delivery location 126, the timing determination module 150 may send a message to a courier, e.g., a first courier 120(1), to assign the delivery job to the first courier. The timing determination module 150 may also send a message to the buyer device to let the buyer 110 know that a courier has been assigned, and that the ETA of the courier to the delivery location is 16 minutes. Subsequently, when the timing determination module 150 determines that the buyer is 12 minutes away, e.g., at the third buyer location 204(3), the timing determination module 150 may send an instruction to the merchant 114 to begin preparation of the order, and may provide the merchant with the ETA of the courier travelling to the merchant pickup location.

As still another example, suppose that the first courier 120(1) and the second courier 120(2) are both in the vicinity of the merchant (e.g., within 8 minutes travel time) when the buyer stops to talk to the friend at the buyer location 204(2) (e.g., 20 minutes travel time from the delivery location) Accordingly, the timing determination module 150 might not yet assign the delivery of the order to either of the couriers 120(1) or 120(2). Further, suppose that the buyer talks for half an hour and both the first courier 120(1) and the second courier 120(2) are assigned to other delivery jobs, go off-duty, or the like. Subsequently, suppose that the buyer starts traveling toward the delivery location again. Further, suppose that this leaves a third courier 120(3) as the closest courier to the merchant pickup location 124. For instance, suppose that the third courier is 13 minutes travel time from the pickup location. Consequently, in this example, the second threshold time is equal 13+3+5=22 minutes. When the buyer resumes traveling toward the delivery location 126, the third courier 120(3) may be assigned immediately to the delivery job so that the courier 120(3) may still be able to arrive at the delivery location at approximately the same time as the buyer.

As still another example, suppose that while the buyer 110 stopped off at the second buyer location 206, the service provider experiences a surge in orders from other buyers (not shown in FIG. 2) such that all of the couriers 120 in the vicinity of the merchant pickup location 124 are assigned to delivering the other orders. Subsequently, when the buyer 110 again begins moving toward the delivery location 126, the timing determination module 150 may try to locate an off-duty courier who is willing to become active to deliver the item to the delivery location 126. For example, the timing determination module 150 may send a message to a courier device associated with at least one inactive courier for activating the inactive courier. In some cases, the timing determination module 150 may send messages to a plurality of courier devices associated with inactive couriers to determine current locations of the inactive couriers and/or to determine whether the inactive couriers are interested in becoming active to start delivering orders. Inactive couriers who are interested in becoming active may allow their courier devices to respond with their current location information. If there is an inactive courier near the merchant pickup location 124 who is interested in becoming active, the delivery job may be assigned to that courier. If more than one inactive courier expresses an interest in becoming active, the timing determination module 150 may assign the delivery job to the inactive courier who is nearest to the merchant pickup location 124.

In some examples, the merchant may continually prioritize and de-prioritize orders based in part on order information received from the service computing device 102. For instance, in the example above, the buyer 110 may have stopped off at a store to make a purchase at the second buyer location 206, or may have stopped to talk to a friend. Consequently, the timing determination module 150 may send a message to the merchant 114 indicating that the particular buyer's order has been delayed, and the merchant may delay preparation of the order accordingly. Subsequently, when the buyer 110 reaches a location such that the predicted buyer travel time 204 to the delivery location 126 is approximately equal to the first threshold time (i.e., the predicted courier travel time 210 to the delivery location plus the item preparation time 212), the timing determination module 150 may send an instruction to the merchant 114 to begin preparation of the item. In response, the merchant 114 can re-prioritize the particular order over other orders the merchant 114 may have received so that the order is ready at a time that coincides with the courier ETA of the courier at the merchant's pickup location 124.

Figure 3:
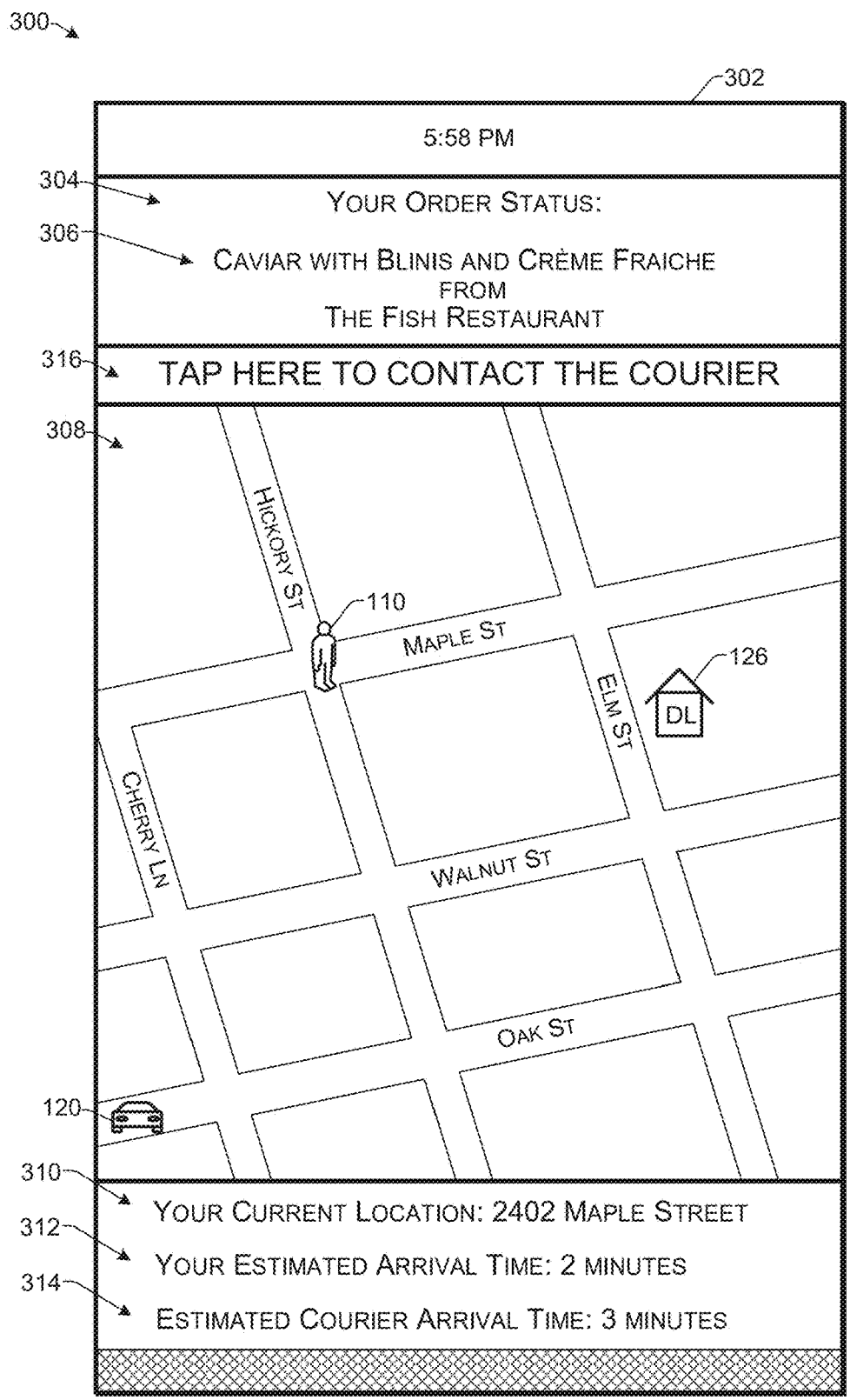
FIG. 3 illustrates an example graphic user interface for presentation on a buyer device according to some implementations.

FIG. 3 illustrates an example GUI 300 presenting delivery order timing status on a display 302 associated with the buyer device 132 according to some implementations. The GUI 300 presents information to provide an update to the buyer associated with the buyer device 132 regarding the courier ETA for delivering the buyer's order to the delivery location 126. The GUI 300 includes an order status message 304, including a description 306 of the order, which in this example is an order for caviar with blinis and crème fraiche from a merchant doing business as "The Fish Restaurant". In addition, the GUI 300 includes a map 308, a textual indication 310 of the buyer's current location, a textual indication 312 of the buyer's ETA to the delivery location, and a textual indication 314 of the courier ETA to the delivery location. For instance, the map 308 may show the position of the buyer 110 and the courier 120 relative to each other and relative to the delivery location 126. Furthermore, the GUI 300 may include a virtual control area 316 that the buyer may tap on or otherwise select, such as for contacting the courier 120 if the buyer will not arrive at the delivery location 126 before the courier, or the like.

Figure 4:
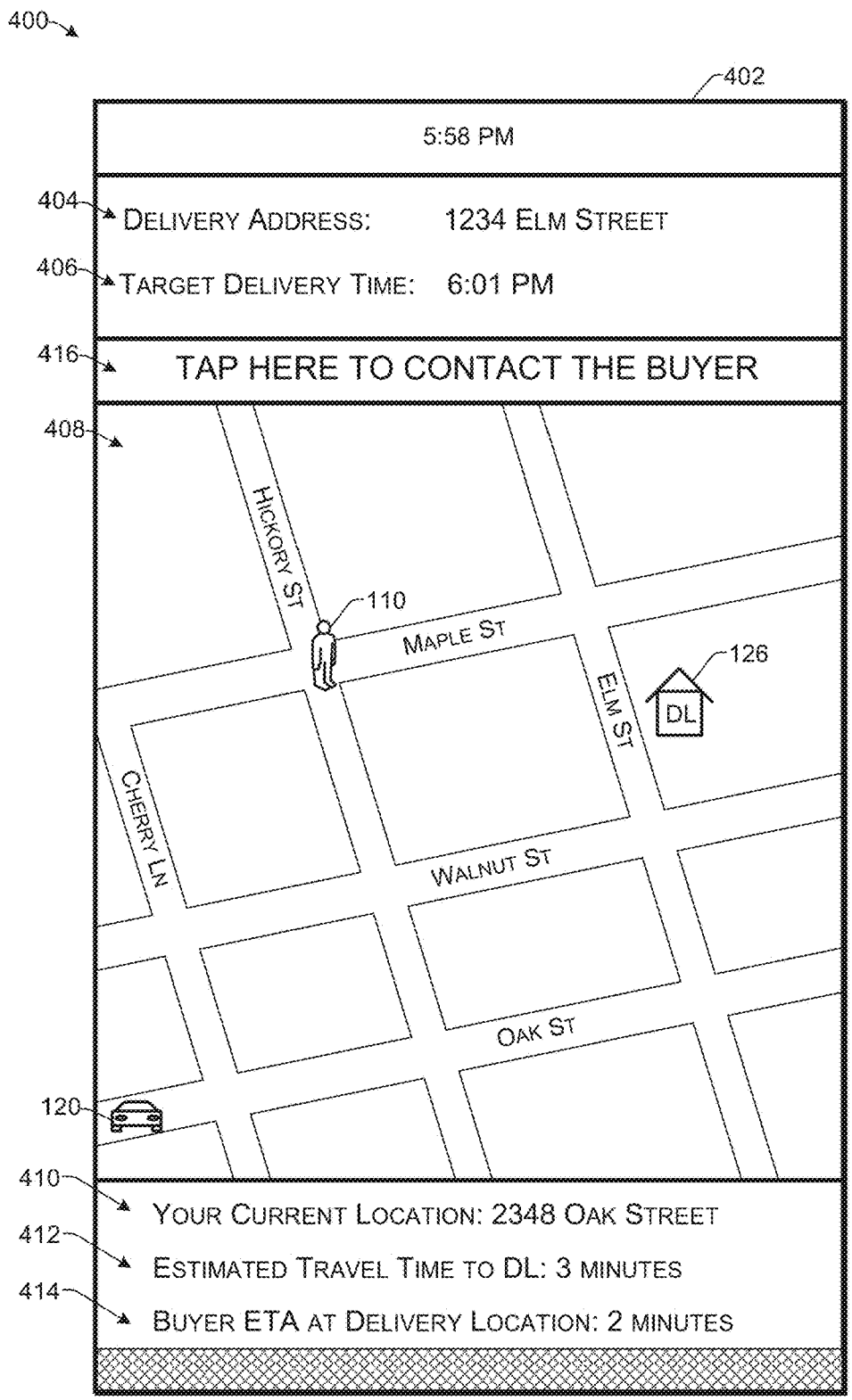
FIG. 4 illustrates an example graphic user interface for presentation on a courier device according to some implementations.

FIG. 4 illustrates an example GUI 400 presenting delivery timing status on a display 402 associated with the courier device 136 according to some implementations. The GUI 400 may present the delivery address 404 to which the order is being delivered, and a target delivery time 406 at which the order is targeted be delivered to the delivery location. The GUI 400 may further include a map 408, a textual indication 410 of the courier's current location, a textual indication 412 of the courier's ETA to the delivery location, and a textual indication 414 of the buyer's ETA to the delivery location. For instance, the map 408 may show the position of the buyer 110 and the courier 120 relative to each other and relative to the delivery location 126. Furthermore, the GUI 400 may include a virtual control area 416 that the courier may tap on or otherwise select, such as for contacting the buyer 110 if the courier arrives at the delivery location 126 before the buyer, or the like.

Figure 5:
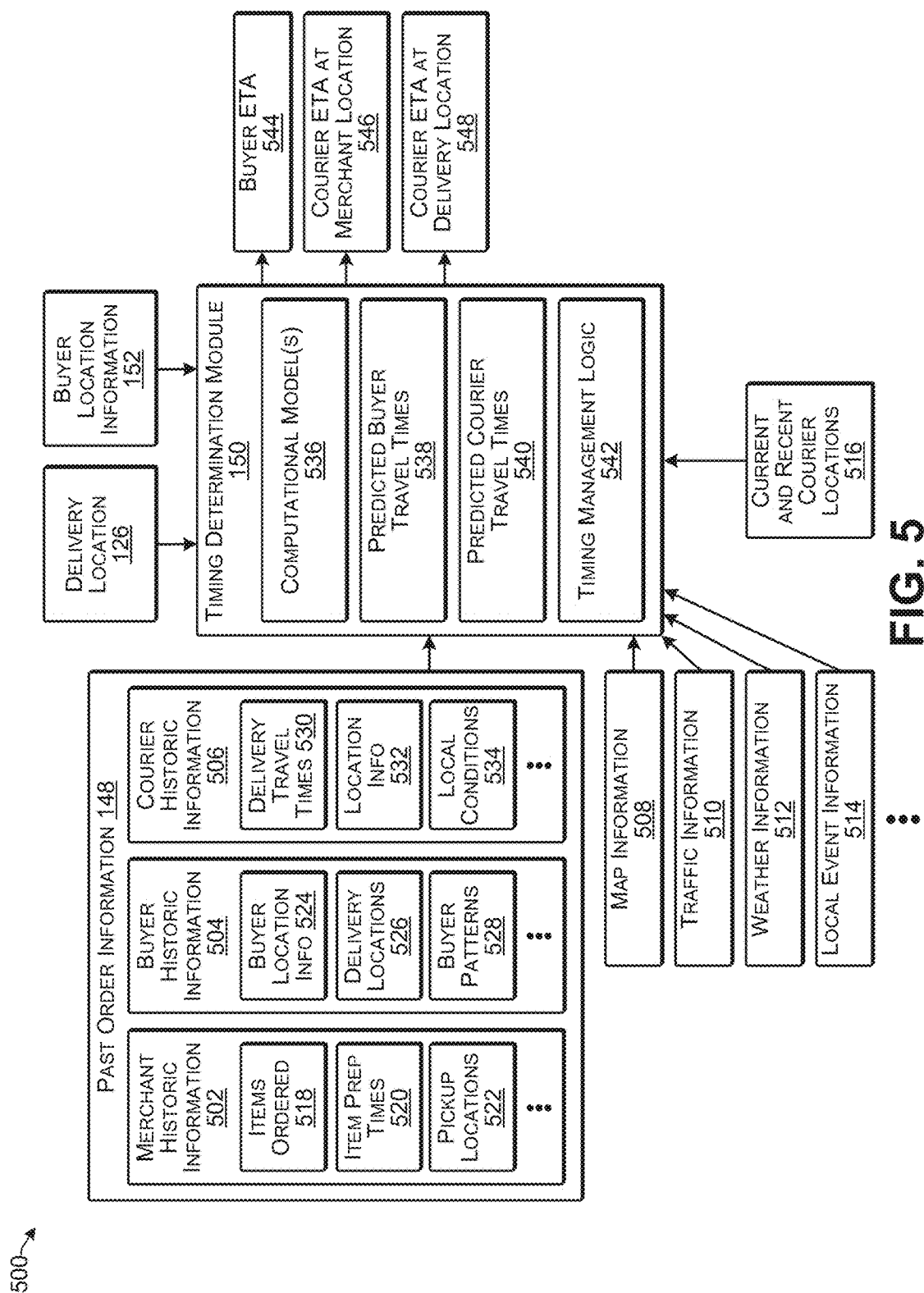
FIG. 5 is a block diagram illustrating an example framework for determining delivery timing estimates according to some implementations.

FIG. 5 is a conceptual block diagram 500 illustrating an example of information that may be used for determining delivery timing according to some implementations. In this example, the timing determination module 150 may receive the past order information 148 including merchant historic information 502, buyer historic information 504, and courier historic information 506. In addition, the timing determination module 150 may receive map information 508, traffic information 510, weather information 512, local event information 514, and/or current and recent courier location information 516. Further, while several types of information that may be used by the timing determination module 150 are illustrated, in other examples, other or additional types of information may be used by the timing determination module 150, as discussed above, and/or as will be apparent to those of skill in the art having the benefit of the disclosure herein.

The merchant historic information 502 includes historic order information related to the merchants, e.g., various types of information related to past orders filled by the merchants that participate in the service of the service provider 104. For instance, the merchant historic information 502 may include items ordered 518 from each merchant at particular times on particular days of the week, particular dates, and the like. Further, the merchant historic information 502 may include the preparation times 520 for each item prepared by each merchant and the pickup locations 522 associated with each merchant. As one example, each merchant may specify an expected preparation time for each item or each category of item offered by the merchant. In other examples, the service provider may determine item preparation times based on empirical information, such as how long it actually took a particular merchant to prepare a particular item for past orders.

Additionally, the buyer historic information 504 includes historic order information related to the buyers. Examples of buyer historic information 504 may include buyer location information, e.g., the buyer location at which an order was placed. The buyer historic information 504 may further include delivery locations 526 to which an order was delivered, and buyer travel patterns 528. For instance, the buyer travel patterns may be empirical information regarding patterns of buyer movement that are indicative of different modes of transportation, such as riding in a car, riding on a train, riding a bicycle, walking, jogging, running, or the like. For instance, if an accelerometer on the buyer device indicates a repetitive motion associated with walking, and the GPS receiver on the buyer device indicates a generally constant movement at a speed approximating walking, then the buyer pattern may be predicted to be walking e.g., within a threshold level of confidence. Accordingly, as discussed additionally below, the predicted buyer travel time and buyer ETA may be predicted based at least in part on this determination.

Further, the courier historic information 506 includes historic order information related to the couriers. For example, the courier historic information 506 may include delivery travel times 530, which may indicate the time that an order was picked up and the time that the order was delivered, e.g., how long it took each courier to deliver each order after picking up the order from the merchant's pickup location. Additionally, location information 532 may include locations of individual couriers at different times of day, for different days of the week, in different parts of the service region, etc. For instance, the courier location information 532 may indicate speeds at which couriers are able to travel on different streets in the service region at different times of day, thereby providing an indication of traffic information and an indication of predicted courier travel times at different times of day and on different days of the week.

In addition, the courier historic information 506 may include local conditions 534 during delivery of past orders, such as traffic conditions and weather conditions when particular orders were fulfilled, information regarding any local events taking place within the service region when the orders were fulfilled, and the like. Furthermore, the merchant historic information 502, the buyer historic information 504, and the courier historic information 506 may include additional types of information, with the foregoing being merely several examples of the types of information that may be used by the timing determination module 150.

In some implementations, the timing determination module 150 may employ one or more computational models 536 for determining predicted buyer travel times 538 for buyers who place orders for delivery at delivery locations 126 that are remote from the buyers' order location. For instance, the timing determination module 150 may determine the predicted buyer travel times 538 based in part on the buyer location information 152 received from the buyer device following placement of the order, as well as taking into account buyer patterns 528 and historic buyer location information 524. For example, if the buyer patterns 528 indicate that a buyer who just placed an order is riding a bicycle, the computational model 536 may predict the buyer travel time to the delivery location based at least in part on this determination. As another example, if the particular buyer has place an order from the same buyer order location in the past for delivery to the same delivery location 126, the buyer travel time for the previous order may be taken into consideration, and in some cases, used as a baseline by the computational model 536 when determining the predicted buyer travel time for the current order.

Further, the local weather may have an effect on the predicted buyer travel times 538. For example, a buyer who walks or rides a bike on sunny days might drive or take the bus, train or other public transportation on a rainy day or a very cold day. Accordingly, the weather information 512 may be obtained from an online source or other suitable source, and may be used when determining the predicted buyer travel times 538. As another example, if the buyer is traveling in a car, the local traffic may be taken into consideration by the computational model 536, such as based on traffic information determined from tracking movement of the courier fleet, as discussed additionally below, and/or based on traffic information 510 from an online map service, such as may be obtained from a website or other online source.

Furthermore, in some examples, the timing determination module 150 may employ the one or more computational models 536 for determining predicted courier travel times 540 between merchant pickup locations and buyer delivery locations and/or from an initial courier location to a merchant pickup location, such as for a particular day at a particular delivery time. The predicted courier travel times 540 may be based in part on the courier historic information 506, such as based on courier location information 532 that indicates courier movement within the service region at particular times, on particular days, on particular dates, during particular types of weather, or while other local conditions 534 are in effect.

The predicted courier travel times may further be based at least in part on current or future information, such as weather forecast information 512, and local event information 514. As one example, based at least in part on the one or more computational models 536, the timing determination module 150 may determine a confidence score for a prediction of how long it will take a courier to travel from a first point to a second point within the service region at a particular time on a particular day of the week. The current and recent courier location information 516 may also be considered when determining the predicted courier travel times 540. For example, recent courier movement, or lack thereof, may indicate unexpectedly heavy traffic. Additionally, in some examples, traffic information 510 from an online map service, such as may be obtained from a webserver or other network source, may also be used or taken into consideration by the computational model when determining the predicted courier travel times. Thus, the predicted courier travel time may be determined based on map information, current or predicted traffic conditions, as well as weather conditions, local events, street closures, construction projects, and so forth. In cases in which the buyer is traveling by car, the predicted buyer travel time 538 may be determined using similar information and techniques.

As one example, the computational model(s) 536 may include one or more trained statistical models that account for numerous pieces of information included in the past order information 148, as well as current information, such as time, day and date information, traffic information 510, weather information 512, local event information 514, and the like. In some cases, the one or more statistical models 536 may be initially trained using a set of training data, checked for accuracy, and then used for predicting at least one of buyer travel times or courier travel times based on a confidence score exceeding an acceptable threshold of confidence. The statistical model(s) may be periodically updated and re-trained based on new training data to keep the model(s) up to date and accurate. For instance, actual courier travel times compared with the predicted courier travel times may be used to update or refine the statistical model(s). Examples of suitable statistical models that may be incorporated into the computational model(s) 536 herein may include regression models, such as linear and nonlinear regression models, and stochastic models, such as Markov models, hidden Markov models, and so forth.

Additionally, while the computational model 536 has been described as one example of a technique for predicting buyer travel times 538 and/or predicted courier travel times 540, numerous other techniques, algorithms, decision-making rules, and the like, may additionally or alternatively be used for determining this information. Accordingly, implementations herein are not limited to use of a computational model 536.

After the timing determination module 150 has determined, for a particular delivery order, a predicted buyer travel time 538 and predicted courier travel times 540, the timing determination module 150 may apply timing management logic 542 to these predictions, such as to generate delivery timings for couriers, generating instructions for merchants to start preparation of an order, and/or for sending messages to the buyer, such as to inform the buyer of the status of the order. For instance, the timing management logic 542 may determine a buyer ETA 544 to the delivery location, a courier ETA 546 to the merchant location, and a courier ETA 548 to the delivery location. The timing management logic 542 may further determine an item preparation time for a particular order, such as based on the item preparation times 520 included in the merchant historic information 502, and/or based on order confirmation information received from the merchant for a particular order.

In some examples, the timing management logic 542 may include one or more algorithms, one or more computational models, a plurality of decision-making rules, or the like, configured to determine delivery timings based on the predicted item buyer travel times 538 and the predicted courier travel times 540. For instance, the timing management logic 542 may employ the various different considerations discussed above, such as the first threshold time and the second threshold time to determine the delivery timings based on the predicted courier travel times 540 from a particular merchant pickup location to a particular delivery location plus the item preparation time approximately equal to the predicted buyer travel time to the delivery location.

In some examples, the timing determination module 150 may receive, from a courier device, an indication of a time when the courier picks up an order from a pickup location and a time at which the courier delivers the order to the delivery location. The timing determination module 150 may adjust the delivery timings and/or the computational model 536 and/or the timing management logic 542 for determining the delivery timings based on the location information and other feedback received from the courier devices over a period of time. For example, if the actual courier travel time is different from that predicted by the computational model 536, the computational model 536 may be modified to predict courier travel times more accurately. As another example, if delivery to a particular address typically requires an additional 5-10 minutes between when the courier arrives at the location and when the courier indicates that the delivery is complete, the address may correspond to a high rise building, or the like, and the additional delivery time required may be taken into consideration in the future.

Figure 6:
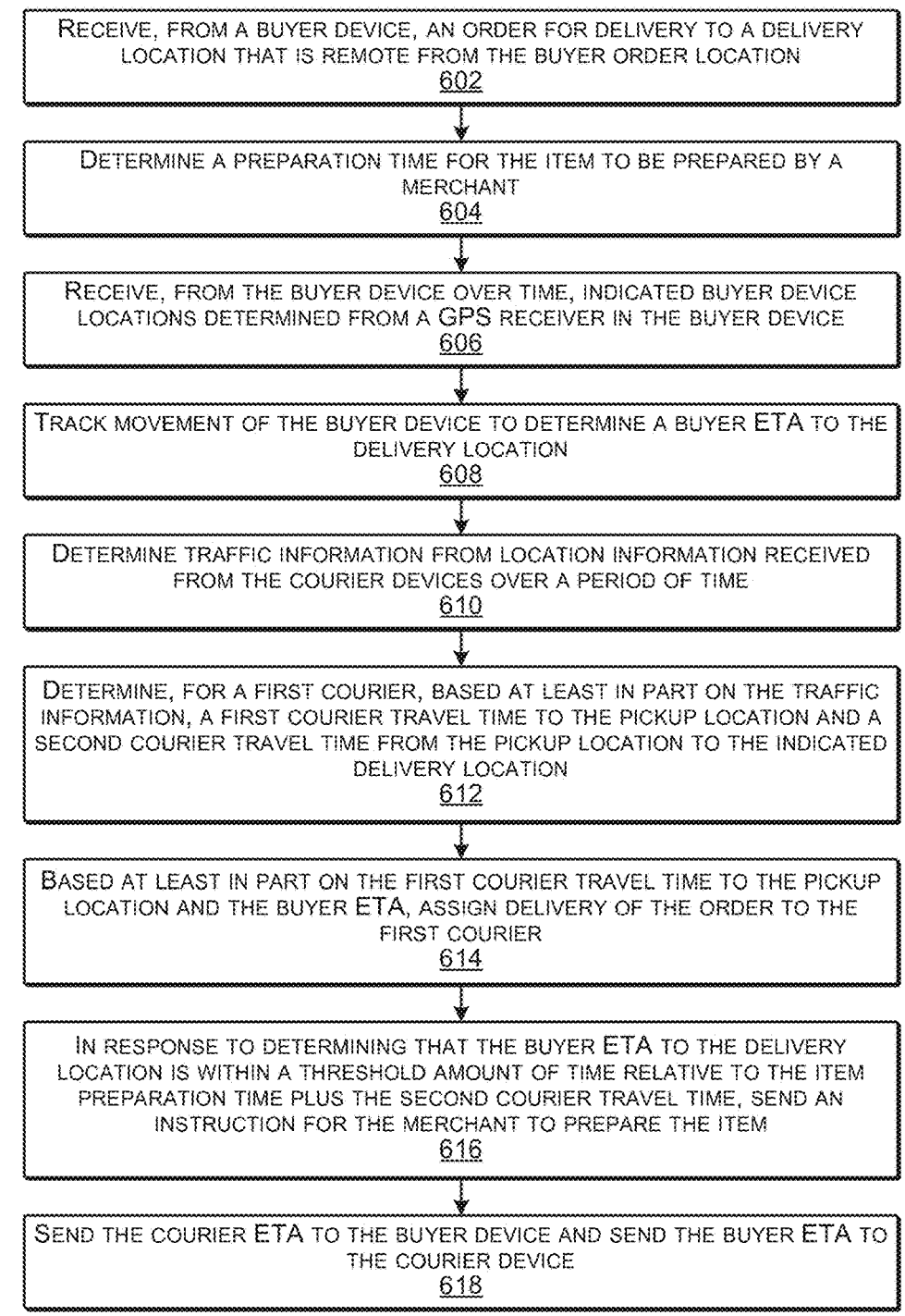
FIG. 6 is a flow diagram illustrating an example process for timing deliveries according to some implementations.
Figure 7:
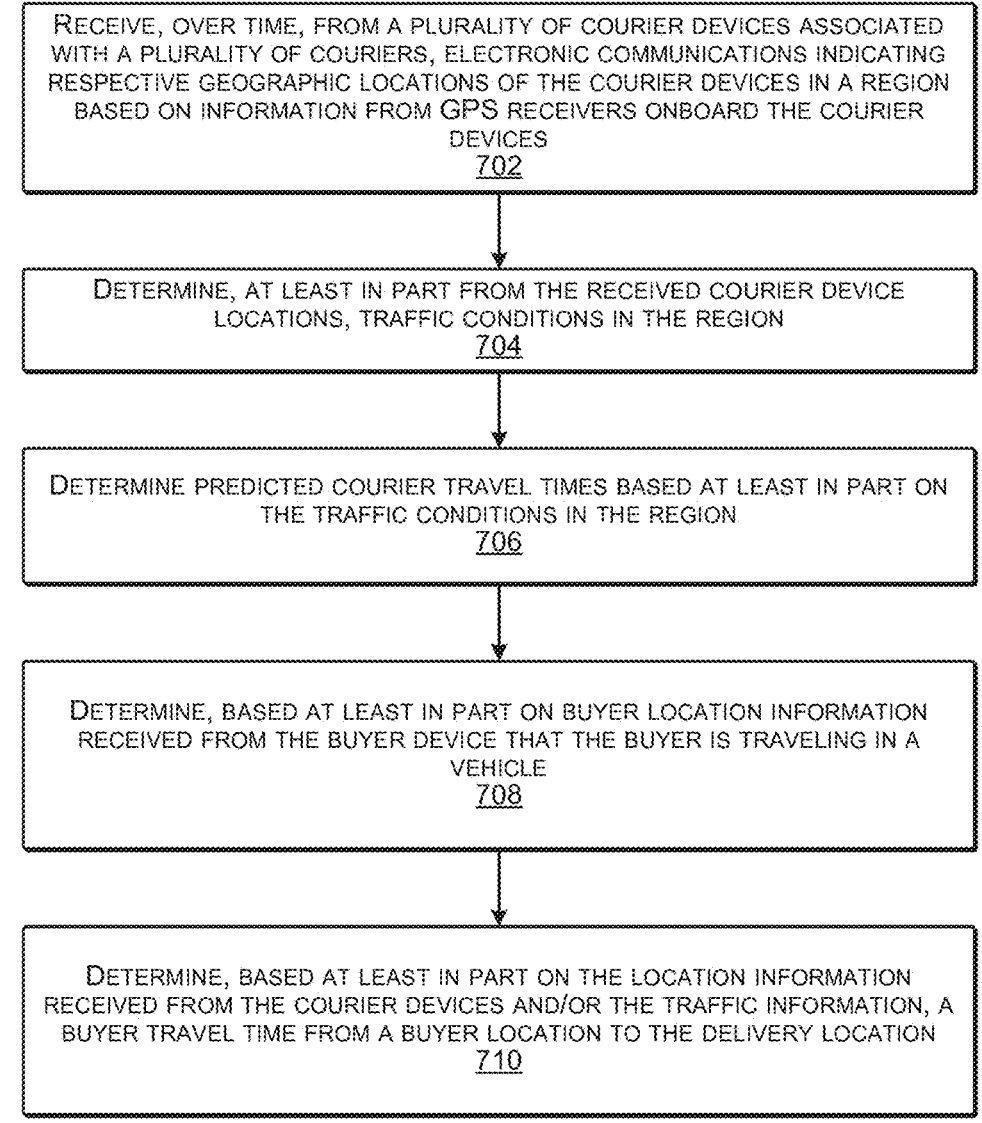
FIG. 7 is a flow diagram illustrating an example process for using a plurality of courier devices for timing deliveries according to some implementations.

FIGS. 6 and 7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 6 is a flow diagram illustrating an example process 600 for determining item information based on variable delivery timings according to some implementations. In some examples, the process may be executed in part by the service computing device 102 and in part by the buyer device 132, the courier devices 136, and/or other suitable computing device.

At 602, the computing device, may receive, from a buyer device, an order for delivery to a delivery location that is remote from the buyer order location. For example, the computing device may receive, from a buyer device, an order for an item from a merchant. The order may indicate that the item is to be delivered to an indicated delivery location that is remote from a location of the buyer device used to place the order.

At 604, the computing device may determine a preparation time for the item(s) to be prepared by a merchant. For instance, the computing device may determine the preparation time for the item based at least in part on a message received from the merchant indicating the preparation time for the item, and/or past order history indicative of actual preparation times for at least one of the item or the merchant.

At 606, the computing device may receive, from the buyer device over time, indicated buyer device locations, such as may be determined from a GPS receiver in the buyer device. For example, the computing device may receive, from the courier devices over a period of time, indicated locations of the courier devices based at least in part on respective geographic locations of the courier devices determined from the respective courier device GPS receivers. Further, the computing device may determine, based at least in part on movement of the courier devices, traffic information for a region including the indicated delivery location.

At 608, the computing device may track movement of the buyer device to determine a buyer ETA to the delivery location. For example, the computing device may receive, from the buyer device, over time, indicated buyer device locations based at least in part on the geographic location of the buyer device determined from the buyer device GPS receiver. Further, the computing device may track movement of the buyer device relative to the delivery location based at least in part on the indicated buyer device locations received from the buyer device over time, to determine the buyer ETA to the delivery location.

At 610, the computing device may determine traffic information from location information received from the courier devices over a period of time. As mentioned above, the traffic information may be determined based at least in part on tracking movement of the plurality of courier device in the region.

At 612, the computing device may determine for a first courier, based at least in part on the traffic information, a first courier travel time to the pickup location and a second courier travel time from the pickup location to the indicated delivery location. For example, the courier travel times may be determined based on past courier travel times for past orders, weather conditions or predications, traffic, local events, or the like, as enumerated elsewhere herein.

At 614, based at least in part on the first courier travel time to the pickup location and the buyer ETA, the computing device may assign delivery of the order to the first courier. For example, the computing device may send a communication to the first courier device to assign delivery of the order to the first courier at a timing based at least in part on comparing the buyer ETA with a time threshold. The time threshold may be determined based at least in part on the courier travel time to the pickup location plus the courier travel time from the pickup location to the indicated delivery location plus a buffer time for the first courier to go into the merchant's store to pick up the item.

At 616, in response to determining that the buyer ETA to the delivery location is within a threshold amount of time relative to the item preparation time plus the second courier travel time, the computing device may send an instruction for the merchant to prepare the item.

At 618, the computing device may send the courier ETA to the buyer device and send the buyer ETA to the courier device. For example, the buyer device may be programmed to present the courier ETA in a GUI on the buyer device display. Further, the courier device may be programmed to present the buyer ETA in a GUI on the courier device display.

FIG. 7 is a flow diagram illustrating an example process 700 for determining traffic information and buyer and courier travel times according to some implementations. In some examples, the process may be executed by the service computing device 102 or by another suitable computing device.

At 702, the computing device may receive, over time, from a plurality of courier devices associated with a plurality of couriers, electronic communications indicating respective geographic locations of the courier devices in a region based on information from GPS receivers onboard the courier devices.

At 704, the computing device may determine, at least in part from the received courier device locations, traffic conditions in the region.

At 706, the computing device may determine predicted courier travel times based at least in part on the traffic conditions in the region. For example, the courier travel times may be determined based on past courier travel times for past orders, weather conditions or predications, traffic, local events, or the like, as enumerated elsewhere herein.

At 708, the computing device may determine, based at least in part on buyer location information received from the buyer device that the buyer is traveling in a vehicle. As one example, the computing device may receive, from the buyer device, acceleration information indicative of movement of the buyer device, and may compare the acceleration information and changes in the buyer location information with patterns indicative of different modes of travel to determine a mode of travel indicated for the buyer. Further, the computing device may determine the buyer ETA based at least in part on the mode of travel indicated for the buyer.

At 710, the computing device may determine, based at least in part on the location information received from the courier devices, acceleration information and/or the traffic information, a buyer travel time from a buyer location to the delivery location.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
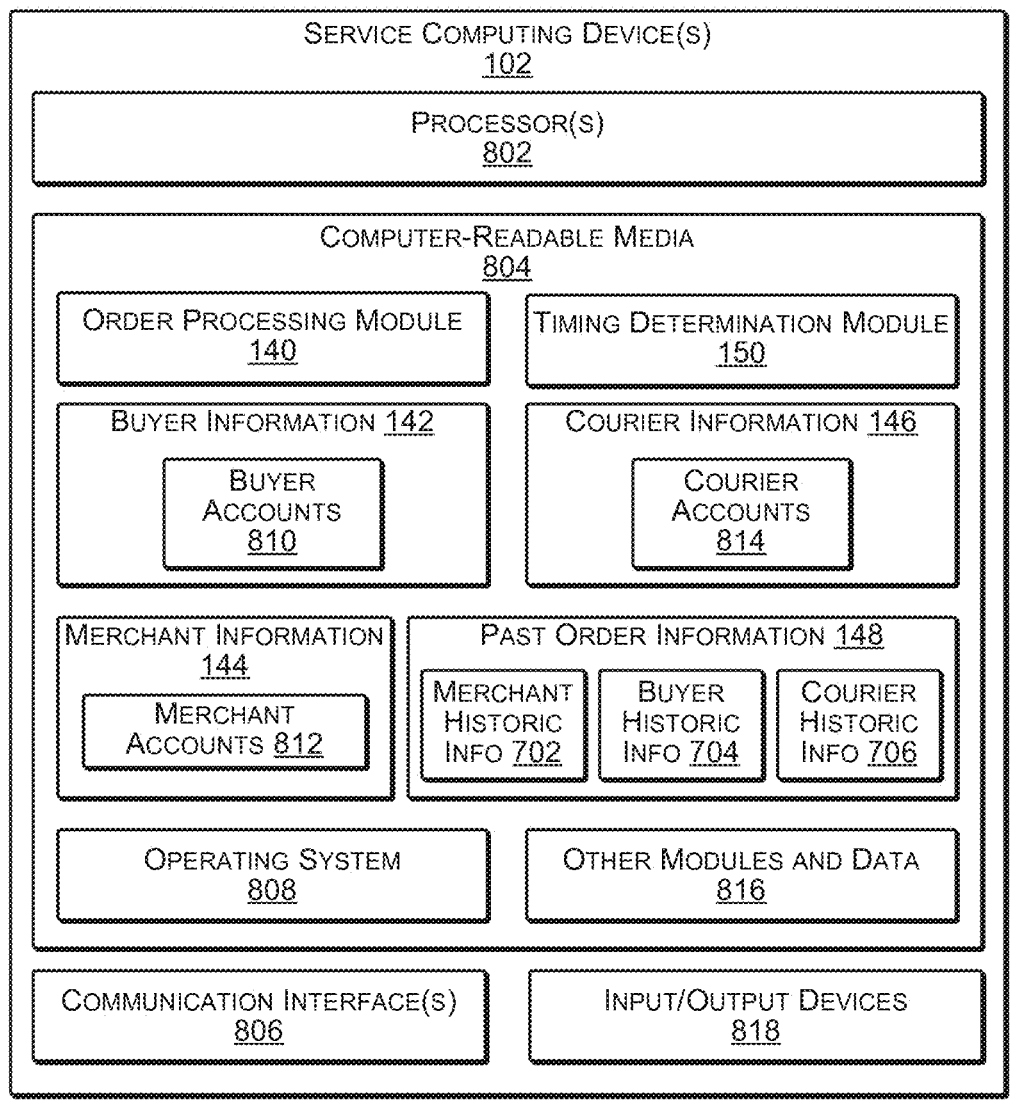
FIG. 8 illustrates select components of one or more example service computing devices according to some implementations.

FIG. 8 illustrates select components of the service computing device 102 that may be used to implement some functionality of the variable delivery timings and order processing services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the order processing module 140 and the timing determination module 150. Additional functional components stored in the computer-readable media 804 may include an operating system 808 for controlling and managing various functions of the service computing device 102.

In addition, the computer-readable media 804 may store data used for performing the operations described herein. Thus, the computer-readable media 804 may store the buyer information 142, including buyer accounts 810, the merchant information 144, including merchant accounts 812, and the courier information 146, including courier accounts 814. Further, the computer-readable media may include the past order information 146, such as the merchant historic information 502, the buyer historic information 504, and the courier historic information 506. The service computing device 102 may also include or maintain other functional components and data not specifically shown in FIG. 8, such as other modules and data 816, which may include programs, drivers, etc., and the data used or generated by the functional components. Further, the service computing device 102 may include many other logical, programmatic, and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 818. Such I/O devices 818 may include a display, various user interface controls (e.g., buttons, joystick, keyboard, mouse, touch screen, etc.), audio speakers, connection ports and so forth.

Figure 9:
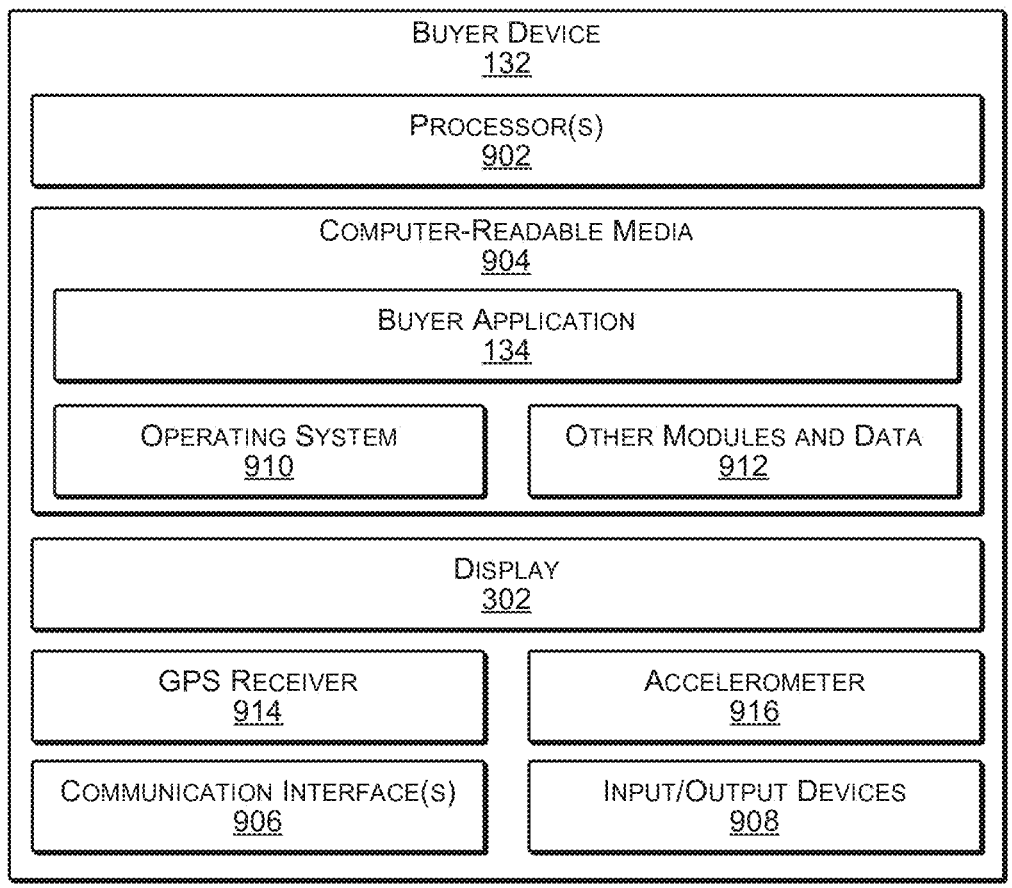
FIG. 9 illustrates select components of an example buyer device according to some implementations.

FIG. 9 illustrates select example components of the buyer device 132 that may implement the functionality described above according to some examples. The buyer device 132 may be any of a number of different types of portable computing devices. Some examples of the buyer device 132 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 9, the buyer device 132 includes components such as at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the buyer device 132, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 904 may include, but is not limited to, RAM, ROM, EEPROM, flash memory, solid-state storage, magnetic disk storage, optical storage, and/or other computer-readable media technology. Further, in some cases, the buyer device 132 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules, or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the buyer device 132. Functional components of the buyer device 132 stored in the computer-readable media 904 may include the buyer application 134, as discussed above, which may present the buyer with one or more GUIs for placing an order, some examples of which are described above. Additional functional components may include an operating system 910 for controlling and managing various functions of the buyer device 132 and for enabling basic user interactions with the buyer device 132.

In addition, the computer-readable media 904 may also store data, data structures and the like, that are used by the functional components. Depending on the type of the buyer device 132, the computer-readable media 904 may also optionally include other functional components and data, such as other modules and data 912, which may include applications, programs, drivers, etc., and the data used or generated by the functional components. Further, the buyer device 132 may include many other logical, programmatic, and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 9 further illustrates that the buyer device 132 may include the display 302. Depending on the type of computing device used as the buyer device 132, the display 302 may employ any suitable display technology. For example, the display 302 may be a liquid crystal display, a plasma display, a light emitting diode display, an OLED (organic light-emitting diode) display, an electronic paper display, or any other suitable type of display able to present digital content thereon. In some examples, the display 302 may have a touch sensor associated with the display 302 to provide a touchscreen display configured to receive touch inputs for enabling interaction with a GUI presented on the display 302. Accordingly, implementations herein are not limited to any particular display technology. Alternatively, in some examples, the buyer device 132 may not include a display.

The buyer device 132 may further include the one or more I/O devices 908. The I/O devices 908 may include speakers, a microphone, a camera, and various user controls (e.g., buttons, a joystick, a keyboard, a keypad, etc.), a haptic output device, and so forth. Other components included in the buyer device 132 may include various types of sensors, which may include a GPS receiver 1014 able to indicate location information, an accelerometer 1016 able to indicate various patterns of motion, as well as other sensors (not shown) such as a gyroscope, compass, proximity sensor, and the like. In some cases, the GPS receiver 914 may be used by the buyer application 134 to determine a current geographic location of the buyer device 132. Additionally, or alternatively, the communication interfaces 906 may be used to determine the current location of the buyer device 132, such as based on communication with nearby cell towers, wireless access points, and the like. In some examples, the buyer device 132 may use various geolocation techniques, mapping services, e.g., a web mapping service application, or the like, to determine location data to be communicated to the service computing device 102. For example, the buyer device 132 can be configured to obtain and communicate data that describes a travel distance, e.g., in terms of feet, miles, or kilometers, from a buyer's geographic location to the delivery location. The geographic location of the delivery location can be determined, for example, based on a geographically identifiable address, e.g., a street address that was provided by the buyer. In another example, the buyer device 132 can be configured to obtain and communicate data that describes a buyer's ETA for reaching the delivery location. The ETA can be expressed as an actual time at which the buyer may arrive at the delivery location, e.g., 6:30 PM, or a number of minutes at which the buyer will arrive, e.g., 20 minutes. Additionally, the buyer device 132 may include various other components that are not shown, examples of which include removable storage, a power source, such as a battery and power control unit, and so forth. Further, the merchant device 128 may include hardware structures and components similar to those described for the buyer device 132, but with one or more different functional components.

Figure 10:
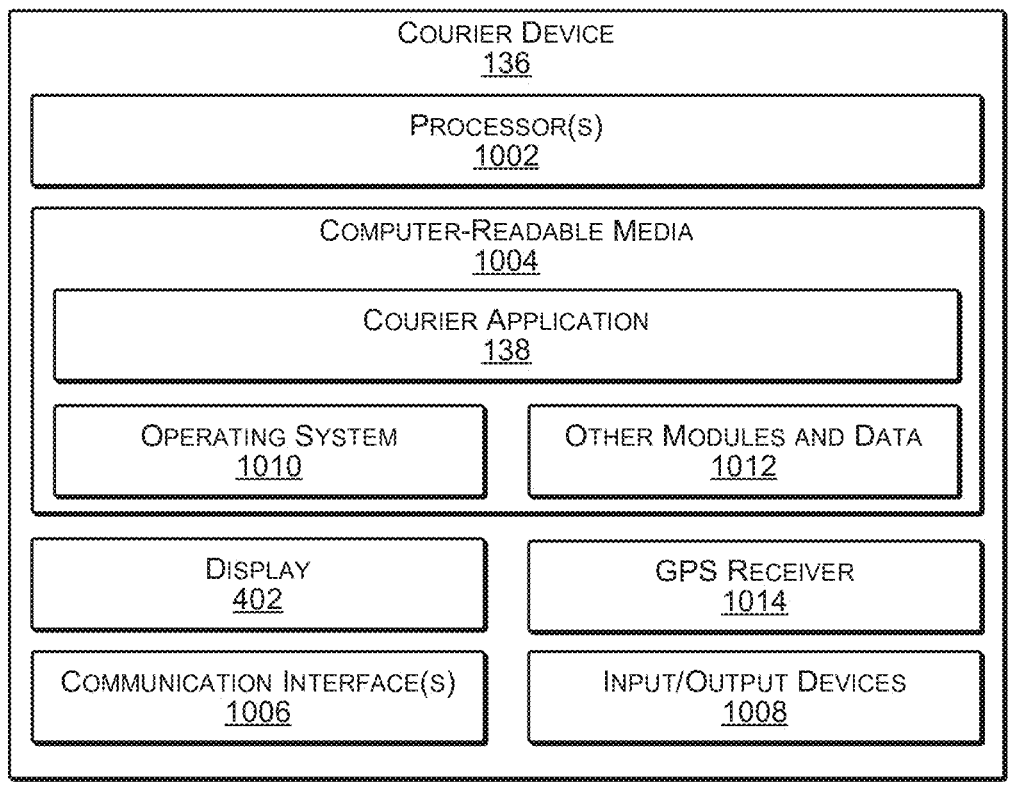
FIG. 10 illustrates select components of an example courier device according to some implementations.

FIG. 10 illustrates select example components of the courier device 136 that may implement the functionality described above according to some examples. The courier device 136 may be any of a number of different types of portable computing devices. Some examples of the courier device 136 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 10, the courier device 136 includes components such as at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the courier device 136, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1004 may include, but is not limited to, RAM, ROM, EEPROM, flash memory, solid-state storage, magnetic disk storage, optical storage, and/or other computer-readable media technology. Further, in some cases, the courier device 136 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules, or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the courier device 136. Functional components of the courier device 136 stored in the computer-readable media 1004 may include the courier application 138, as discussed above, which may present the courier with one or more GUIs, some examples of which are described above. Additional functional components may include an operating system 1010 for controlling and managing various functions of the courier device 136 and for enabling basic user interactions with the courier device 136.

In addition, the computer-readable media 1004 may also store data, data structures and the like, that are used by the functional components. Depending on the type of the courier device 136, the computer-readable media 1004 may also optionally include other functional components and data, such as other modules and data 1012, which may include applications, programs, drivers, etc., and the data used or generated by the functional components. Further, the courier device 136 may include many other logical, programmatic, and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 10 further illustrates that the courier device 136 may include the display 402, which may be the any of the types of displays 302 described above with respect to the buyer device 132. The courier device 136 may further include the one or more I/O devices 1008. The I/O devices 1008 may include speakers, a microphone, a camera, and various user controls (e.g., buttons, a joystick, a keyboard, a keypad, etc.), a haptic output device, and so forth. Other components included in the courier device 136 may include various types of sensors, which may include a GPS receiver 1016 able to indicate location information, as well as other sensors (not shown) such as an accelerometer, gyroscope, compass, proximity sensor, and the like. In some cases, the GPS receiver 1016 may be used by the courier application 138 to determine a current geographic location of the courier device 136. Additionally, or alternatively, the communication interfaces 1006 may be used to determine the current location of the courier device, such as based on communication with nearby cell towers, wireless access points, and the like. In some examples, the courier application 138 may send this location information periodically to the service computing device as an indicated location of the associated courier. In some examples, the courier device 136 may use various geolocation techniques, mapping services (e.g., a web mapping service application), or the like, to determine location information to be communicated to the service computing device 102. For example, the courier device 136 can be configured to obtain and communicate data that describes a travel distance, e.g., in terms of feet, miles, or kilometers, from the courier's geographic location to the delivery location and/or the merchant pickup location. The geographic location of the delivery location and/or the merchant pickup location can be determined, for example, based on a geographically identifiable address, e.g., a street address that was provided by the service provider. In another example, the courier device 136 can be configured to obtain and communicate data that describes the courier's ETA for reaching the delivery location and/or the merchant pickup location. The courier ETA can be expressed as an actual time at which the courier may arrive at the delivery location or the pickup location, e.g., 6:30 PM, or a number of minutes at which the courier will arrive, e.g., 20 minutes. Additionally, the courier device 136 may include various other components that are not shown, examples of which include removable storage, a power source, such as a battery and power control unit, and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system to manage delivery timing for delivery of an item to a delivery location that is remote from a buyer order location so that the delivery of the item approximately coincides with arrival of a buyer at the delivery location, the system comprising:
   a buyer device associated with the buyer, the buyer device including a processor, a display coupled to the processor, a buyer device GPS receiver coupled to the processor, and a communication interface coupled to the processor for communicating over one or more networks, the buyer device programmed to continually determine, based at least in part on information from the GPS receiver, a geographic location of the buyer device;
   a plurality of courier devices associated with a plurality of respective couriers, each courier device including a processor, a display coupled to the processor, a GPS receiver coupled to the processor, and a communication interface coupled to the processor for communicating over the one or more networks, each courier device programmed to continually determine, based at least in part on information from its GPS receiver, a geographic location of the courier device; and
   a service computing device including a processor and a communication interface coupled to the processor for communicating over the one or more networks with the buyer device and the plurality of courier devices, the service computing device programmed to:
      receive, from an application executing on the buyer device, an order for an item from a merchant and an indication that the item is to be delivered to a delivery location that is remote from a location of the buyer device used to place the order;
      determine a preparation time for the item to be prepared by the merchant;
      continually receive, from the buyer device, updated location information of the buyer device based at least in part on the geographic location of the buyer device determined from the GPS receiver;
      track movement of the buyer device relative to the delivery location, to update, over time, based at least in part on the updated location information continually received from the buyer device, a buyer estimated time of arrival (ETA) at the delivery location;
      receive, from the courier devices over a period of time, indicated locations of the courier devices based at least in part on respective geographic locations of the courier devices determined from the GPS receivers of the courier devices;
      determine, based at least in part on movement of the courier devices, traffic information for a region including the delivery location;
      determine, for a first courier associated with a first courier device of the plurality of courier devices, based at least in part on the traffic information and a respective geographic location of the first courier device, a first courier travel time to a pickup location of the merchant and a second courier travel time from the pickup location of the merchant to the delivery location;
      based at least in part on the first courier travel time to the pickup location and the buyer ETA, send a communication to the first courier device to assign delivery of the order to the first courier;
      determine a first amount of time based on the item preparation time for the item plus the second courier travel time from the pickup location of the merchant to the delivery location;
      compare, over time, the updates to the buyer ETA with the first amount of time;
      in response to determining, based on comparing the updates to the buyer ETA with the first amount of time, that the buyer ETA is within a threshold amount of time of the first amount of time, send, to a merchant device associated with the merchant, an instruction to prepare the item;
      following pick up of the item by the first courier, track movement of the first courier device relative to the delivery location based at least in part on updated location information received from a GPS receiver of the first courier device, over time, to determine updated locations of the first courier device relative to the delivery location and a travel time for the first courier to arrive at the delivery location;

based on the updated location information received over time from the first courier device, send, to the buyer device, the updated locations of the first courier device so that the application executing on the buyer device is updated in real time to: (i) present a graphical user interface (GUI) indicating, via a map, the updated locations of the first courier device and an updated buyer device location relative to the delivery location and (ii) further present, in the GUI, the travel time for the first courier to arrive at the delivery location and the buyer ETA; and based on the updated location information received over time from the buyer device, send, to the first courier device, updated buyer device locations so that an application executing on the first courier device is updated in real time to: (i) present a GUI indicating, via a map, a location of the first courier device and the updated buyer device locations relative to the delivery location and (ii) further present, in the GUI, the buyer ETA and the travel time for the first courier to arrive at the delivery location.

2. The system as recited in claim 1, wherein:
the buyer device further includes an accelerometer, and the buyer device is further programmed, by the application executing on the buyer device, to send, to the service computing device, acceleration information indicative of movement of the buyer device; and the service computing device is programmed to:
compare the acceleration information and the updated location information of the buyer device with patterns indicative of different modes of travel to determine a mode of travel for the buyer; and
determine the buyer ETA based at least in part on the mode of travel determined for the buyer.

3. The system as recited in claim 1, wherein the service computing device is further programmed to determine the preparation time for the item based at least in part on at least one of:
a message received from the merchant indicating the preparation time for the item; or
past order history indicative of actual preparation times for at least one of the item or the merchant.

4. The system as recited in claim 1, wherein the service computing device is further programmed to:
prior to sending the instruction to the merchant device, send, to the merchant device, a notification of the order and a request to deprioritize the order until the instruction to prepare the item is received.

5. A method comprising:
receiving, by a computing device, from an application executing on a buyer device, an order for an item from a merchant and an indication that the item is to be delivered to a delivery location that is remote from a location of the buyer device;
determining, by the computing device, a courier travel time from a pickup location of the merchant to the delivery location;
determining, by the computing device, a first amount of time based on an item preparation time for the item plus the courier travel time from the pickup location of the merchant to the delivery location;
continually receiving, by the computing device, from the buyer device, updated location information of the buyer device determined from a GPS receiver of the buyer device;
updating, over time, by the computing device, based at least in part on the updated location information continually received from the buyer device, a buyer estimated time of arrival (ETA) at the delivery location;
comparing, over time, by the computing device, updates to the buyer ETA with the first amount of time;
in response to determining, based on the comparing, that the buyer ETA is within a threshold amount of time of the first amount of time, sending, by the computing device, to a merchant device associated with the merchant, an instruction to prepare the item;
following picking up of the item by a courier, tracking, by the computing device, movement of a courier device associated with the courier relative to the delivery location based at least in part on updated location information received from a GPS receiver of the courier device, over time, to determine updated locations of the courier device relative to the delivery location and travel time for the courier to arrive at the delivery location; and
based on the updated location information received over time from the courier device, sending, by the computing device, to the buyer device, the updated locations of the courier device, so that the application executing on the buyer device is updated in real time to: (i) present a graphical user interface (GUI) indicating, via a map, the updated locations of the courier device and an updated buyer device location relative to the delivery location and (ii) further present, in the GUI, the travel time for the courier to arrive at the delivery location and the buyer ETA.

6. The method as recited in claim 5, further comprising:
receiving, from the buyer device, the updated location information of the buyer device based at least in part on a geographic location of the buyer device determined through information received from the GPS receiver of the buyer device, wherein the updated location information is received based on a detected acceleration of the buyer device exceeding a threshold acceleration.

7. The method as recited in claim 5, further comprising:
receiving, from the buyer device, acceleration information indicative of movement of the buyer device;
comparing the acceleration information and the updated location information of the buyer device with patterns indicative of different modes of travel to determine a mode of travel indicated for the buyer; and
determining the buyer ETA based at least in part on the mode of travel indicated for the buyer.

8. The method as recited in claim 5, further comprising:
receiving, over time, from a plurality of courier devices associated with a plurality of couriers, locations of the courier devices based at least in part on respective geographic locations of the courier devices determined from GPS receivers of the courier devices;
based at least in part on the respective geographic locations received over time, tracking movement of the courier devices in a region including the delivery location and the pickup location;
determining an indication of traffic conditions in the region based at least in part on tracking the movement of the courier devices; and determining the courier travel time from the pickup location of the merchant to the delivery location based at least in part on the traffic conditions.

9. The method as recited in claim 5, further comprising determining the preparation time for the item based at least in part on at least one of:
   receiving a message from the merchant indicating the preparation time for the item; or
   determining the preparation time from past order history indicative of actual preparation times for at least one of the item or the merchant.

10. The method as recited in claim 5, further comprising:
    determining, for the courier associated with the courier device, an initial courier travel time from a courier location to the pickup location; and
    based at least in part on comparing the buyer ETA with the initial courier travel time to the pickup location, sending a communication to the courier device to assign delivery of the order to the courier.

11. The method as recited in claim 10, further comprising:
    sending the communication to the courier device to assign delivery of the order to the courier at a timing based at least in part on comparing the buyer ETA with a second amount of time, wherein the second amount of time is determined based at least in part on the initial courier travel time to the pickup location plus the first amount of time plus a buffer time for the courier to pick up the item.

12. The method as recited in claim 5, further comprising:
    receiving, from a plurality of courier devices, respective location information of the courier devices based at least in part on respective geographic locations of the courier devices determined from GPS receivers of the courier devices;
    determining, at least in part from the received respective location information of the courier devices, an actual courier travel time for a past order;
    comparing the actual courier travel time with a predicted courier travel time for the past order to determine a difference between the predicted courier travel time for the past order and the actual courier travel time; and
    determining the courier travel time from the pickup location of the merchant to the delivery location based at least in part on the difference between the actual courier travel time and the predicted courier travel time for the past order.

13. One or more non-transitory computer-readable media maintaining instructions that, when executed by one or more processors, program the one or more processors to:
    receive, by the one or more processors, from an application executing on a buyer device, an order for an item to be prepared by a merchant and an indication of a delivery location for the item, wherein the delivery location is remote from a location of the buyer device;
    continually receive, by the one or more processors, from the buyer device, updated location information of the buyer device determined from a GPS receiver of the buyer device;
    update, a over time, by the one or more processors, based at least in part on the updated location information continually received from the buyer device, a buyer estimated time of arrival (ETA) at the delivery location;
    determine, by the one or more processors, a courier travel time from a merchant pickup location to the delivery location;
    determine, by the one or more processors, a first amount of time based on an item preparation time for the item plus the courier travel time from the pickup location of the merchant to the delivery location;
    compare, over time, by the one or more processors, updates to the buyer ETA with the first amount of time;
    in response to determining, based on the comparing, that the buyer ETA is within a threshold amount of time of the first amount of time, send, by the one or more processors, to a merchant device associated with the merchant, an instruction to prepare the item;
    send, by the one or more processors, to the buyer device, an indication of the courier travel time from the merchant pickup location to the delivery location;
    following picking up of the item by a courier, tracking, by the one or more processors, movement of a courier device associated with the courier relative to the delivery location based at least in part on updated location information received from a GPS receiver of the courier device, over time, to determine updated locations of the courier device relative to the delivery location and a travel time for the courier to arrive at the delivery location; and
    based on the updated location information received over time from the courier device, sending, by the one or more processors, to the buyer device, the updated locations of the courier device, so that the application executing on the buyer device is updated in real time to: (i) present a graphical user interface (GUI) indicating, via a map, the updated locations of the courier device and an updated buyer device location relative to the delivery location and (ii) further present, in the GUI, the travel time for the courier to arrive at the delivery location and the buyer ETA.

14. The one or more non-transitory computer-readable media as recited in claim 13, wherein the instructions further program the one or more processors to:
    receive, from a plurality of courier devices associated with a plurality of couriers, locations of the courier devices based at least in part on respective geographic locations of the courier devices determined through information from respective GPS receivers of the courier devices, wherein the respective geographic locations are received over time to enable tracking of movement of the courier devices; and
    determine the courier travel time from the merchant pickup location to the delivery location based at least in part on the movement of the courier devices tracked over time.

15. The one or more non-transitory computer-readable media as recited in claim 13, wherein the instructions further program the one or more processors to:
    receive, from a plurality of courier devices associated with a plurality of couriers, locations of the courier devices based at least in part on respective geographic locations of the courier devices determined through information from respective GPS receivers of the courier devices, wherein the respective geographic locations are received over time to enable tracking of movement of the courier devices for determining, at least in part, traffic information,
    determine, based at least in part on the updated location information continually received from the buyer device, that the buyer is traveling in a vehicle; and
    determine, based at least in part on the traffic information, the buyer ETA.

16. The one or more non-transitory computer-readable media as recited in claim 15, wherein the instructions further program the one or more processors to:

receive, from the buyer device, acceleration information indicative of movement of the buyer device; and compare the acceleration information and the updated location information of the buyer device with patterns indicative of different modes of travel to determine that the buyer is traveling in the vehicle.

17. The one or more non-transitory computer-readable media as recited in claim 16, wherein the instructions further program the one or more processors to:

send the instruction to prepare the item to the merchant device in response to determining that the buyer ETA is within a second threshold amount of time of the first amount of time.

18. The one or more non-transitory computer-readable media as recited in claim 13, wherein the instructions further program the one or more processors to:

prior to sending the instruction to the merchant device, send, to the merchant device, a notification of the order and a request to deprioritize the order until the instruction to prepare the item is received.

19. A system comprising:

one or more processors; and one or more computer-readable media storing instructions which, when executed by the one or more processors, cause the one or more processors to perform operations comprising:

receiving, by the one or more processors, from an application executing on a buyer device, an order for an item from a merchant and an indication that the item is to be delivered to a delivery location that is remote from a location of the buyer device;

determining, by the one or more processors, a courier travel time from a pickup location of the merchant to the delivery location;

determining, by the one or more processors, a first amount of time based on an item preparation time for the item plus the courier travel time from the pickup location of the merchant to the delivery location;

continually receiving, by the one or more processors, from the buyer device, updated location information of the buyer device determined from a GPS receiver of the buyer device;

updating, over time, by the one or more processors, based at least in part on the updated location information continually received from the buyer device, a buyer estimated time of arrival (ETA) at the delivery location;

comparing, over time, by the one or more processors, updates to the buyer ETA with the first amount of time;

in response to determining, based on the comparing, that the buyer ETA is within a threshold amount of time of the first amount of time, sending, by the one or more processors, to a merchant device associated with the merchant, an instruction to prepare the item;

following picking up of the item by a courier, tracking, by the one or more processors, movement of a courier device associated with the courier relative to the delivery location based at least in part on updated location information received from a GPS receiver of the courier device, over time, to determine updated locations of the courier device relative to the delivery location and a travel time for the courier to arrive at the delivery location; and based on the updated location information received over time from the courier device, sending, by the one or more processors, to the buyer device, the updated locations of the courier device, so that the application executing on the buyer device is updated in real time to: (i) present a graphical user interface (GUI) indicating, via a map, the updated locations of the courier device and an updated buyer device location relative to the delivery location and (ii) further present, in the GUI, the travel time for the courier to arrive at the delivery location and the buyer ETA.

20. The system as recited in claim 19, the operations further comprising:

receiving, from the buyer device, the updated location information of the buyer device based at least in part on a geographic location of the buyer device determined through information from the GPS receiver of the buyer device, wherein the updated location information is received based on a detected acceleration of the buyer device exceeding a threshold acceleration.

21. The system as recited in claim 20, the operations further comprising:

receiving, from the buyer device, acceleration information indicative of movement of the buyer device;

comparing the acceleration information and the updated location information of the buyer device with patterns indicative of different modes of travel to determine a mode of travel indicated for the buyer; and determining the buyer ETA based at least in part on the mode of travel indicated for the buyer.

22. The system as recited in claim 19, the operations further comprising:

sending a communication to the courier device to assign delivery of the order to the courier at a timing based at least in part on comparing the buyer ETA with a second amount of time, wherein the second amount of time is determined based at least in part on an initial courier travel time to the pickup location of the merchant plus the first amount of time plus a buffer time for the courier to pick up the item.

* * * * *